(12) United States Patent
Miyoshi et al.

(10) Patent No.: US 7,566,424 B2
(45) Date of Patent: Jul. 28, 2009

(54) EXHAUST GAS PURIFICATION CATALYST

(75) Inventors: Seiji Miyoshi, Hiroshima (JP); Hiroshi Yamada, Hiroshima (JP); Akihide Takami, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 591 days.

(21) Appl. No.: 11/178,411

(22) Filed: Jul. 12, 2005

(65) Prior Publication Data

US 2006/0019824 A1 Jan. 26, 2006

(30) Foreign Application Priority Data

| Jul. 23, 2004 | (JP) | ............................. 2004-215649 |
| Jul. 30, 2004 | (JP) | ............................. 2004-223720 |
| Aug. 2, 2004 | (JP) | ............................. 2004-225980 |

(51) Int. Cl.
*B01D 50/00* (2006.01)
(52) U.S. Cl. .................................................. 422/180
(58) Field of Classification Search ................ 422/168, 422/177, 180; 423/213.5; 502/304, 326
See application file for complete search history.

(56) References Cited

U.S. PATENT DOCUMENTS

| 6,150,288 | A | 11/2000 | Suzuki et al. |
| 6,294,140 | B1 * | 9/2001 | Mussmann et al. ....... 423/213.5 |
| 6,306,794 | B1 | 10/2001 | Suzuki et al. |

FOREIGN PATENT DOCUMENTS

| EP | 0 834 348 | 4/1998 |
| EP | 1 166 858 A2 | 1/2002 |
| JP | 08-281106 | 10/1996 |
| JP | 11-169712 | 6/1999 |
| JP | 2004-174490 | 6/2004 |
| JP | 2004223403 | 8/2004 |
| JP | 2005028334 | 2/2005 |
| WO | WO 2004/004896 A1 | 1/2004 |

OTHER PUBLICATIONS

Patent Abstracts of Japan, Publication No. 2004-174490, Publication Date Jun. 24, 2004.
Patent Abstracts of Japan, Publication No. 08-281106, Publication Date Oct. 29, 1996.
Patent Abstracts of Japan, Publication No. 11-169712, Publication Date Jun. 29, 1999.
European Search Report dated Oct. 18, 2005.

* cited by examiner

*Primary Examiner*—Tom Duong
(74) *Attorney, Agent, or Firm*—Studebaker & Brackett PC; Donald R. Studebaker

(57) ABSTRACT

A Ce—Zr mixed oxide is employed as an oxygen storage component for a lean-NOx catalyst, and catalytic precious metal atoms are placed at and/or between crystal lattice points of the mixed oxide. This structure prevents the sintering of the precious metal and accelerates movement of oxygen ions in each of crystallites of the Ce—Zr mixed oxide to increase the oxygen storage/release amount of the mixed oxide, which enhances the NOx removal performance of the catalyst.

15 Claims, 14 Drawing Sheets

EXHAUST GAS PURIFICATION CATALYST

CROSS-REFERENCES TO RELATED APPLICATIONS

This application claims priority under 35 USC 119 to Japanese Patent Application No. 2004-215649 filed on Jul. 23, 2004, Japanese Patent Application No. 2004-223720 filed on Jul. 30, 2004, and Japanese Patent Application No. 2004-225980 filed on Aug. 2, 2004, the entire contents of all of which are incorporated herein by reference.

BACKGROUND OF THE INVENTION (a) Field of the Invention

This invention relates to exhaust gas purification catalysts for reducing NOx (nitrogen oxides) emissions from vehicle engines.

(b) Description of the Related Art

Lean-NOx catalysts are known as catalysts for purifying exhaust gases from vehicle engines. The lean-NOx catalysts contain a NOx storage component such as barium (Ba), and a catalytic metal such as platinum (Pt). In an oxygen-rich atmosphere of exhaust gas (during engine operation at lean air-fuel ratios) where the oxygen concentration in the exhaust gas is high, the lean-NOx catalysts store NOx in the exhaust gas with the NOx storage component. When the oxygen concentration in the exhaust gas drops (during engine operation in the vicinity of the ideal air-fuel ratio or at rich air-fuel ratios), the catalysts release NOx stored in the NOx storage component and reduce the released NOx to $N_2$ with the catalytic metal. For NOx reduction reaction, HC (hydrocarbon) and CO (carbon monoxide) in the exhaust gas are used as reductants. Therefore, HC and CO are removed from the exhaust gas by oxidation concurrently with the removal of NOx by reduction reaction with HC and CO.

In such a lean-NOx catalyst, a catalytic metal such as Pt and oxygen excessively supplied during lean burn operation are utilized for oxidation of NO in exhaust gas to $NO_2$. This oxidation makes it easy that NO is stored into the NOx storage component.

Japanese Unexamined Patent Publication No. H08-281106 discloses a technique for a lean-NOx catalyst in which all or part of precious metal, such as Pt, is supported by impregnation on ceria serving as an oxygen storage component to accelerate the oxidation of NOx, thereby enhancing the NOx storage effect of the NOx storage component.

Japanese Unexamined Patent Publication No. H11-169712 discloses a lean-NOx catalyst in which first (upper) and second (lower) catalytic layers are formed as a catalytic coating on a honeycomb support, the first catalytic layer has a structure in which a mixture of alumina and cerium dioxide serving as an oxygen storage component are used as a support material and Pt and Ba are supported on the support material, and the second catalytic layer has a structure in which a mixture of cerium dioxide, zirconium dioxide or cerium (Ce)-zirconium (Zr) mixed oxide and alumina are used as a support material and Rh is supported on the support material.

Further, the applicant has previously applied a patent application for a mixed oxide containing Ce, Zr and Rh and a mixed oxide containing Ce, Zr, Nd and Rh which are useful as catalytic materials. The patent application is published as Japanese Unexamined Patent Publication No. 2004-174490. This document discloses that Rh-containing Ce-based mixed oxides of this kind are prepared by coprecipitation, and that if comparison is made between a mixed oxide containing Ce, Zr, Nd and Rh and a substance obtained by post-supporting Rh on a mixed oxide containing Ce, Zr and Nd, the former has a higher oxygen storage capacity (amount of oxygen storage and rate of oxygen storage) and a higher heat resistance.

As described above, in the known technique for forming a lean-NOx catalyst, a catalytic metal such as Pt is supported on a support material such as cerium, for example, by using impregnation to bring a Pt solution into contact with the support material. In this case, however, Pt is easily sintered by heat, which deteriorates the catalyst's functions of oxidation of NO to $NO_2$, NOx reduction and in turn HC and CO oxidations.

Further, since cerium dioxide employed as an oxygen storage component for lean-NOx catalysts has a poor heat resistance, it deteriorates with long-time use of the catalysts to decrease its amount of oxygen storage. When Ce-based mixed oxides containing Ce, for example, Ce—Zr mixed oxides, are employed as oxygen storage components instead, they have high heat resistance but their amounts of oxygen storage and release are small.

Therefore, even when either cerium dioxide or Ce—Zr mixed oxide is used for a lean-NOx catalyst, the catalyst exhibits a poor HC oxidation capacity at low temperatures, so that it cannot take full advantage of the function of catalytic metal to promote HC oxidation and in turn deteriorates its NOx removal performance.

Furthermore, as in the lean-NOx catalyst disclosed in Japanese Unexamined Patent Publication No. H11-169712, when a catalytic coating including a plurality of catalytic layers is formed on a support, the oxygen storage component is generally provided in the lower catalytic layer (the catalytic layer closer to the cell wall) in order to protect it against high-temperature exhaust gas. Since, however, the diffusive flow of exhaust gas through the lower catalytic layer is small, the lower catalytic layer cannot sufficiently utilize highly active oxygen just released from the oxygen storage component for the purpose of HC oxidation, which prevents efficient NOx reduction.

SUMMARY OF THE INVENTION

An object of the present invention is to restrain the sintering of Pt in a lean-NOx catalyst.

Another object of the present invention is to provide a lean-NOx catalyst that can maintain a desired catalytic performance for a long time even when it has a small amount of catalytic metal.

Still another object of the present invention is to improve the heat resistance and oxygen storage/release capacity of an oxygen storage component in a lean-NOx catalyst, thereby accelerating HC oxidation and in turn enhancing the NOx removal performance of the catalyst.

To achieve the above objects, the present invention employs, as an oxygen storage component for a lean-NOx catalyst, a Ce-based mixed oxide in which catalytic precious metal atoms are placed at and/or between crystal lattice points of the mixed oxide.

More specifically, a first aspect of the present invention is directed to an exhaust gas purification catalyst for removing NOx in exhaust gas from an engine by reduction. The catalyst comprises: a honeycomb support; and a catalytic coating supported to walls of cells of the honeycomb support, and the catalytic coating comprises at least a precious metal-doped catalytic layer containing: a NOx storage component that acts to store NOx in the exhaust gas during high oxygen concentrations of the exhaust gas due to the operation of the engine at lean air-fuel ratios and release the stored NOx when the oxygen concentration of the exhaust gas becomes low; a Ce-based mixed oxide in which Ce atoms are placed at crystal lattice points of the mixed oxide, the Ce-based mixed oxide acting as an oxygen storage component for storing oxygen in the exhaust gas during high oxygen concentrations of the exhaust gas and releasing the stored oxygen when the oxygen concentration of the exhaust gas becomes low; and a catalytic precious metal the atoms of which are placed at and/or between crystal lattice points of the mixed oxide.

Since the catalytic precious metal atoms are placed at and/or between crystal lattice points of the Ce-based mixed oxide, they are strongly bonded to the mixed oxide and therefore less likely to be sintered even when exposed to high temperatures. Furthermore, the sintering of the Ce-based mixed oxide itself is also restrained by the action of the catalytic precious metal atoms placed at and/or between crystal lattice points of the mixed oxide, which is advantageous in terms of improvement in the heat resistance of the catalyst. In other words, even when the catalyst is exposed to high temperatures, the Ce-based mixed oxide effectively acts as an oxygen storage component. Therefore, when the oxygen concentration of the exhaust gas becomes high, oxygen is sufficiently released and supplied from the Ce-based mixed oxide. The released oxygen promotes the oxidation of HC in the exhaust gas, which in turn expedites NOx reduction. As a result, the NOx removal performance of the catalyst is improved.

In a second aspect of the invention relating to the first aspect, the catalytic precious metal is Rh and the Rh atoms are placed in crystallites (primary particles) of the Ce-based mixed oxide.

In this case, since Rh atoms are contained in crystallites of the Ce-based mixed oxide, the mixed oxide increases its amount of oxygen storage. The reason for this is believed to be that while oxygen contacting the Ce-based mixed oxide is being taken in the form of ions into oxygen defect sites inside crystallites of the mixed oxide, Rh atoms existing inside each crystallite aid the movement of oxygen ions from the crystallite surface to the inside.

The detailed behavior of Rh atoms can be explained as follows: Rh atoms inside each crystallite of the mixed oxide act to take in oxygen ions from the crystallite surface, so that the oxygen ions can readily move to low oxygen concentration sites (oxygen defect sites) located in the vicinity of the Rh atoms inside the crystallite. Furthermore, since Rh atoms exist in dispersed form in the crystallite, oxygen ions move toward the oxygen defect sites inside the crystallite while "hopping", so to speak, from one Rh atom to another. Therefore, the efficiency of utilization of oxygen defect sites inside the Ce-based mixed oxide is increased, the rate of oxygen storage is raised, and the amount of oxygen storage is also increased.

As a result, the amount of oxygen release of the Ce-based mixed oxide at low oxygen concentrations in the exhaust gas is increased. Therefore, even at low exhaust gas temperatures or low catalyst temperatures, partial oxidation of HC in the exhaust gas is more likely to occur. This enables effective reduction of NOx released from the NOx storage component. The effective NOx reduction expedites the release of NOx from the NOx storage component, which enhances the NOx storage capacity of the NOx storage component at high oxygen concentrations in the exhaust gas.

In a third aspect of the invention relating to the second aspect, the catalytic coating further comprises an outer catalytic layer overlaid on the precious metal-doped catalytic layer and containing one or more kinds of catalytic metals and a NOx storage component.

In this case, even in the precious metal-doped catalytic layer (inner catalytic layer) with poor diffusibility of the exhaust gas, the oxygen storage/release capacity of the Ce-based mixed oxide is improved by the action of Rh atoms as described above. Therefore, even at low temperatures, the oxidation of HC and in turn the reduction of NOx efficiently occur.

In a fourth aspect of the invention relating to the third aspect, the precious metal-doped catalytic layer further contains Pt, and the outer catalytic layer contains Pt and Rh as the catalytic metals, the Rh being supported on alumina.

Therefore, also in the inner catalytic layer, NO in the exhaust gas can be easily oxidized to $NO_2$ by Pt during high oxygen concentrations of the exhaust gas due to engine operation at lean air fuel-ratios. As a result, the NOx storage capacity of the NOx storage component can be improved. When the oxygen concentration in the exhaust gas becomes low, NOx released from the NOx storage component can be reduced by Rh supported on alumina in the outer catalytic layer.

In a fifth aspect of the invention relating to any one of the first to third aspects of the invention, the Ce-based mixed oxide is a Ce—Zr mixed oxide in which Ce atoms and Zr atoms are placed at crystal lattice points of the mixed oxide.

Therefore, the Ce-based mixed oxide has high heat resistance because of the existence of Zr, which is advantageous in maintaining the NOx oxidation and storage properties of the catalyst and in turn the NOx reduction capacity thereof for a long time. Particularly when the Ce-based mixed oxide is rich in Ce, i.e., when the mass ratio of $CeO_2$ to $ZrO_2$ is 1 or more (but not more than 4), preferably $CeO_2:ZrO_2=3:1$, this is advantageous in achieving large amount of oxygen storage while maintaining high heat resistance.

In a sixth aspect of the invention relating to any one of the first to fourth aspects, some of the Rh atoms placed at and/or between crystal lattice points of the Ce-based mixed oxide are exposed at the surfaces of the crystallites of the mixed oxide.

Rh atoms exposed at the surface of each crystallite of the Ce-based mixed oxide act to reduce NOx. Further, since these Rh atoms are placed at and/or between crystal lattice points of the Ce-based mixed oxide and thereby strongly bonded to the Ce-based mixed oxide, they are less likely to be sintered by heat. Therefore, the Rh atoms effectively act to reduce NOx for a long time, though they exist in the inner catalytic layer.

In a seventh aspect of the invention relating to the first aspect, the Ce-based mixed oxide and alumina on which Rh is supported are mixed in the precious metal-doped catalytic layer, the atoms of the catalytic precious metal placed at and/or between crystal lattice points of the Ce-based mixed oxide are Rh atoms, and Pt is supported on the Ce-based mixed oxide.

Also in this aspect, since Rh atoms placed at and/or between crystal lattice points of the Ce-based mixed oxide improve the oxygen storage capacity of the mixed oxide as described above, the amount of oxygen release of the Ce-based mixed oxide at low oxygen concentrations in the exhaust gas is increased. HC in the exhaust gas is easily oxidized by Rh atoms contained in the Ce-based mixed oxide and Pt supported on the Ce-based mixed oxide (improvement in rich-HC conversion).

Further, Rh supported on the alumina acts as a catalytic agent for reducing NOx released from the NOx storage component. Since the Rh-supported alumina and the Ce-based mixed oxide are mixed in one catalytic layer, HC partly oxidized by Rh and Pt is effectively used as a reductant for the reduction of NOx released from the NOx absorbing component (improvement in rich-NOx conversion).

Furthermore, since NOx is effectively reduced as described above, this promotes the release of NOx from the NOx storage component during low oxygen concentrations of the exhaust gas. As a result, the NOx storage capacity of the NOx storage component at high oxygen concentrations in the exhaust gas is increased (improvement in lean-NOx conversion).

In an eighth aspect of the invention relating to the seventh aspect, the catalytic coating further comprises an inner catalytic layer formed on the inside of the precious metal-doped catalytic layer and containing a NOx storage component.

In this aspect, in consideration of the fact that the Ce-based mixed oxide has high heat resistance and an oxygen storage/release capacity less affected by heat as described above, the Ce-based mixed oxide is used in the precious metal-doped catalytic layer (outer catalytic layer) more likely to be exposed to high-temperature exhaust gas. Since the exhaust gas easily diffusively flows through the outer catalytic layer containing the Ce-based mixed oxide, HC in the exhaust gas is easily oxidized by the Ce-based mixed oxide, Rh and Pt when the oxygen concentration of the exhaust gas becomes low. This is advantageous in terms of NOx removal by reduction. Furthermore, when NOx released from the NOx storage component in the inner catalytic layer passes through the outer catalytic layer, the Ce-based mixed oxide, Rh and Pt in the outer catalytic layer are effectively used for the reduction of the released NOx, which is advantageous in terms of improvement in the NOx removal performance of the catalyst.

In a ninth aspect of the invention relating to the eighth aspect, the inner catalytic layer further contains an oxygen storage component for storing oxygen in the exhaust gas during high oxygen concentrations of the exhaust gas and releasing the stored oxygen when the oxygen concentration of the exhaust gas becomes low, the Ce-based mixed oxide in the precious metal-doped catalytic layer has an oxygen storage property that the peak of amount of oxygen release appears in a particular temperature range, and the oxygen storage component in the inner catalytic layer has an oxygen storage property that the amount of oxygen release is less affected by the temperature change over a wide temperature range from lower to higher temperatures than the particular temperature range as compared with the precious metal-doped catalytic layer.

Therefore, like the eighth aspect, this aspect is advantageous in terms of the oxidation of HC in the exhaust gas and the reduction of NOx released from the NOx storage component. Further, according to this aspect, while the oxygen storage component in the inner catalytic layer can ensure a necessary amount of oxygen release over a wide temperature range from low to high temperatures, the oxygen storage component in the outer catalytic layer can release a large amount of oxygen in the particular temperature range. As a result, without the necessity of increasing the volume of oxygen storage component in the outer catalytic layer, HC oxidation and NOx removal can be implemented over a wide temperature range from low to high temperatures and efficiently promoted using a large amount of oxygen released at low oxygen concentrations of the exhaust gas within the particular temperature range. This is advantageous in improving HC and NOx removal performance of the catalyst without raising the production cost.

In a tenth aspect of the invention relating to the ninth aspect, the Ce-based mixed oxide in the precious metal-doped catalytic layer is a Ce—Zr mixed oxide in which Ce atoms and Zr atoms are placed at crystal lattice points of the mixed oxide, and the oxygen storage component in the inner catalytic layer is a Ce—Pr mixed oxide in which Ce atoms and Pr atoms are placed at crystal lattice points of the mixed oxide.

With this structure, the oxygen storage component in the outer catalytic layer has high heat resistance, which is advantageous in maintaining the HC oxidation capacity and in turn the NOx reduction capacity of the catalyst for a long time. Particularly when the Ce-based mixed oxide is rich in Ce, i.e., when the mass ratio of $CeO_2$ to $ZrO_2$ is 1 or more (but not more than 4), preferably $CeO_2:ZrO_2=3:1$, this is advantageous in achieving large amount of oxygen storage while maintaining high heat resistance.

On the other hand, the Ce—Pr mixed oxide which is the oxygen storage component in the inner catalytic layer increases its NOx storage capacity by enhancing the ionization potential of the NOx storage component. The enhancement in the ionisation potential of the NOx storage component means that the NOx storage component is increased in required energy to release electrons (required energy to be cationized). In other words, it means that electrons of the NOx storage component are attracted toward the oxygen storage component so that the NOx storage component becomes positively charged to a greater extent than may be the case with the NOx storage component alone. If, for example, barium carbonate is used as a NOx storage component, the extent to which Ba is charged positively is increased. The NOx storage mechanism in this case can be considered as follows:

Mechanism (spill-over of reaction intermediates)

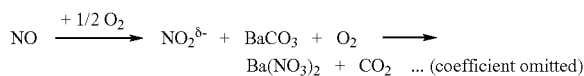

This mechanism states that NO in the exhaust gas is changed to reaction intermediate $NO_2^{\delta-}$ on Pt which is a precious metal and the produced reaction intermediate moves (spills over) onto the NOx storage component and are then absorbed therein. For this mechanism, a condition for promoting the reaction efficiently is that the NOx storage component acts to attract the reaction intermediates (short-life intermediates) negatively charged on the precious metal. In this respect, since the oxygen storage component in question capable of enhancing the ionization potential of the NOx storage component allows the NOx storage component to be charged positively to a greater extent than with the NOx storage component alone, the reaction intermediates are likely to be attracted from on Pt toward the NOx storage component and spill over. As a result, the NOx storage component enhances its NO storage capacity.

In an eleventh aspect of the invention relating to the first aspect, the catalytic precious metal is Pt and at least some of the Pt atoms placed at and/or between crystal lattice points of the Ce-based mixed oxide are exposed at the surfaces of crystallites of the Ce-based mixed oxide.

Since Pt atoms exposed at the surface of each crystallite of the Ce-based mixed oxide are placed at and/or between crystal lattice points of the Ce-based mixed oxide, i.e., since they are strongly bonded to the Ce-based mixed oxide, they are less likely to be sintered by heat, which is advantageous in maintaining for a long time the capacity of reducing NOx released from the NOx storage component and the capacity of oxidizing HC and CO. Conventionally, a larger amount of Pt than initially required is used in a new catalyst product in consideration of deterioration of the above capacities due to the sintering of Pt. In this aspect of the invention, however, the sintering of Pt can be restrained and therefore the amount of use of Pt can be reduced, which is advantageous in terms of cost reduction.

In a twelfth aspect of the invention relating to the eleventh aspect, the catalytic coating further comprises an outer catalytic layer overlaid on the precious metal-doped catalytic layer and containing one or more kinds of catalytic metals and a NOx storage component.

In this case, the Ce-based mixed oxide is contained in the precious metal-doped catalytic layer (inner catalytic layer), which is further advantageous in terms of NOx storage and reduction. Conventional NOx storage components have a problem of sulphur poisoning in that they are deteriorated by the reaction with sulphur content in the exhaust gas. In this aspect of the invention, since the NOx storage component in the inner catalytic layer is covered with the outer catalytic layer, it is less susceptible to sulphur poisoning. Therefore, in the inner catalytic layer, not only NO in the exhaust gas is efficiently oxidized to $NO_2$ by Pt atoms exposed at the crystallite surfaces of the Ce-based mixed oxide, but also the resultant $NO_2$ is certainly stored in the NOx storage component. This is advantageous in terms of NOx reduction.

In a thirteenth aspect of the invention relating to the eleventh or twelfth aspect of the invention, the precious metal-doped catalytic layer further contains Rh supported on the Ce-based mixed oxide by bringing a solution containing Rh into contact with the Ce-based mixed oxide and calcining the solution.

Usually, Rh acts to reduce NOx released from the NOx storage component. In this aspect, Rh binds to Pt atoms exposed at the crystallite surfaces of the Ce-based mixed oxide, thereby preventing the sintering of Pt due to heat produced by Rh. This is advantageous in maintaining the NOx reduction capacity for a long time.

In a fourteenth aspect of the invention relating to the eleventh to thirteenth aspects of the invention, the Ce-based mixed oxide is a Ce—Zr mixed oxide in which Ce atoms and Zr atoms are placed at crystal lattice points of the mixed oxide.

Therefore, the Ce-based mixed oxide has high heat resistance because of the existence of Zr, which is advantageous in maintaining the NOx oxidation and storage properties and in turn the NOx reduction capacity of the catalyst for a long time. Particularly when the Ce-based mixed oxide is rich in Ce, i.e., when the mass ratio of $CeO_2$ to $ZrO_2$ is 1 or more (but not more than 4), preferably $CeO_2:ZrO_2=3:1$, this is advantageous in achieving large amount of oxygen storage while maintaining high heat resistance.

In a fifteenth aspect of the invention relating to the twelfth aspect, the outer catalytic layer further contains alumina on which Rh is supported as the catalytic metal, the precious metal-doped catalytic layer further contains Pt supported on the Ce-based mixed oxide in addition to the Pt atoms which are placed at and/or between crystal lattice points of the Ce-based mixed oxide and some of which are exposed at the surfaces of crystallites of the Ce-based mixed oxide, and the supported Pt and the NOx storage component in the precious metal-doped catalytic layer are supported on the Ce-based mixed oxide by bringing a solution containing Pt and the NOx storage component into contact with the Ce-based mixed oxide and calcining the solution.

In this aspect, Pt and NOx storage component are supported in close proximity to each other on the crystallite surfaces of the Ce-based mixed oxide. This is advantageous, at lean air-fuel ratios, in allowing Pt to oxidize NO in the exhaust gas to $NO_2$ and allowing the NOx storage component to store the resultant $NO_2$. Furthermore, at rich air-fuel ratios, when NOx released from the NOx storage component passes through the outer catalytic layer, it is reduced by Rh in the outer catalytic layer, which is advantageous in terms of improvement in NOx reduction capacity.

In the above aspects of the invention, materials used for the NOx storage component include various kinds of alkaline metals, alkaline earth metals and rare earth metals and a preferable metal for the NOx storage component is barium.

DETAILED DESCRIPTION OF THE INVENTION

Embodiments of the present invention will be described below in detail with reference to the drawings.

Figure 1:
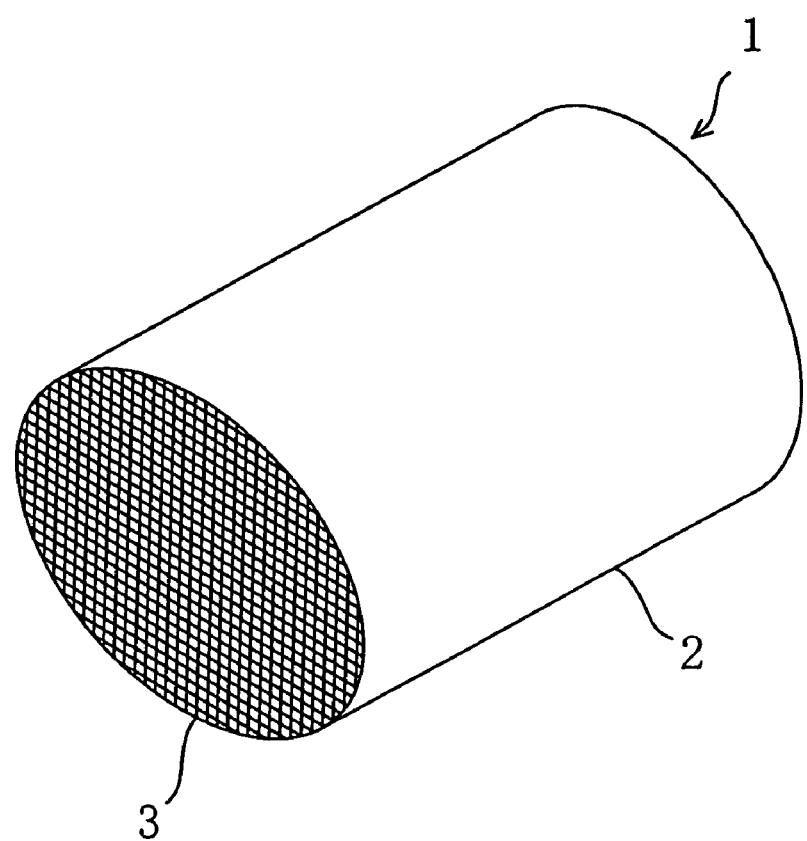
FIG. 1 shows a perspective view of an exhaust gas purification catalyst according to an embodiment of the present invention.

FIG. 1 shows an exhaust gas purification catalyst 1 for a vehicle engine according to the present invention. The catalyst 1 is constructed of a porous monolith support (honeycomb support) 2 which has a plurality of cells 3 running through it in the flow direction of exhaust gas, and a catalytic coating which is formed on the walls of each cell and contains one or more kinds of catalytic metals.

Figure 2:
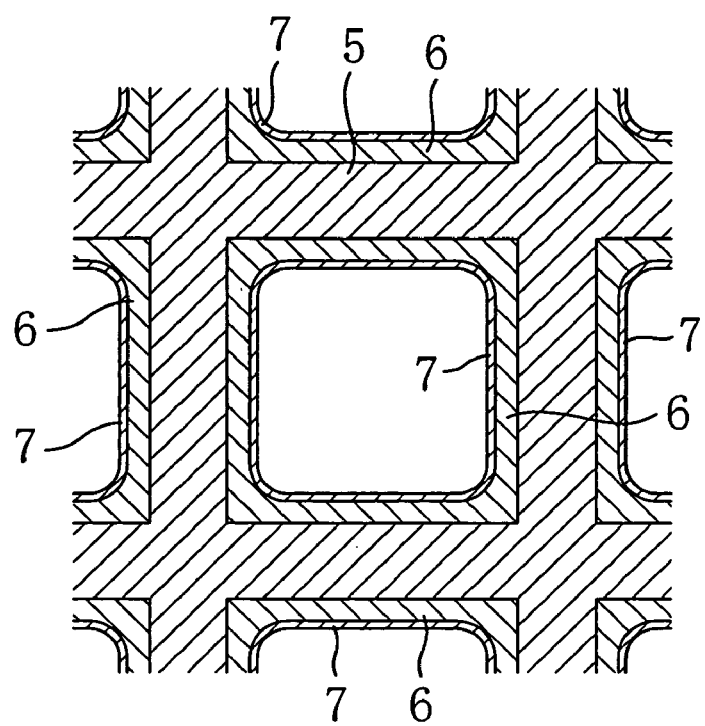
FIG. 2 is an enlarged cross-sectional view showing part of the catalyst.
Figure 3:
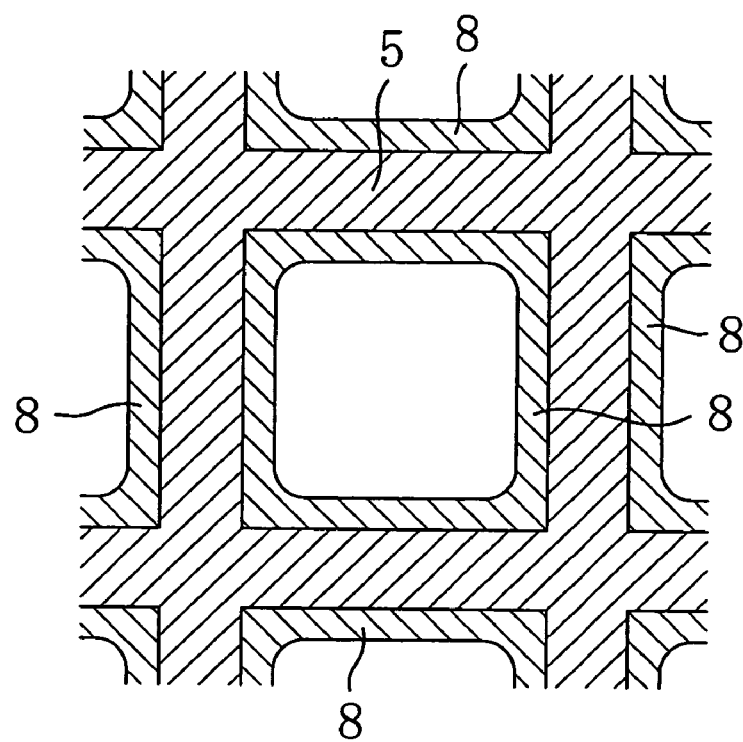
FIG. 3 is an enlarged cross-sectional view showing part of another example of the catalyst.

As schematically shown in FIG. 2, the catalytic coating on each cell of the catalyst 1 comprises an inner catalytic layer 6 formed on the walls 5 of each cell, and an outer catalytic layer 7 overlaid on the inner catalytic layer 6, so that the outer catalytic layer 7 defines an exhaust gas channel. Instead of this structure, a single catalytic layer 8 may be formed on each cell as shown in FIG. 3, or three of more catalytic layers may be formed on each cell.

Hereinafter, specific structures of various examples of the two-layer catalytic coating in the first embodiment of the invention will be described in comparison with those of comparative examples of a two-layer catalytic coating in the known art.

Catalysts of Example 1 and Comparative Example 1

—Structure of Catalytic Coating of Example 1—

The inner catalytic layer 6 shown in FIG. 2 is a precious metal-doped catalytic layer that contains plural kinds of catalytic metals, a Ce-based mixed oxide serving as an oxygen storage component, and a NOx storage component such as Ba. The outer catalytic layer 7 contains plural kinds of catalytic metals and a NOx storage component such as Ba, which are supported on a support material made of a heat-proof inorganic oxide.

More specifically, the Ce-based mixed oxide in the inner catalytic layer 6 contains Rh atoms as catalytic precious metal atoms placed at and/or between crystal lattice points of each of crystallites (primary particles) constituting the mixed oxide. In each crystallite of the Ce-based mixed oxide, some of the Rh atoms are exposed at the crystallite surface and the rest exists inside the crystallite. The inner catalytic layer 6 also contains a support material made of a heat-proof inorganic oxide. The Ce-based mixed oxide and the support material are mixed, and the mixture is adhered to the cell walls 5 using a binder.

The other catalytic metal (or catalytic precious metal) except for Rh is supported to the support material and the Ce-based mixed oxide by bringing a solution containing the other catalytic metal into contact with them and calcining the solution. The NOx storage component is also supported to the support material and the Ce-based mixed oxide by bringing a solution containing materials of the NOx storage component into contact with them and calcining the solution.

The other catalytic metal except for Rh is Pt. The support material is active alumina. The NOx storage component includes K, Sr and Mg in addition to Ba.

On the other hand, in the outer catalytic layer 7, the support material is active alumina likewise, and Rh is supported on the active alumina. The Rh-supported active alumina (Rh/Al$_2$O$_3$) is adhered to the inner catalytic layer 6 using a binder. Pt particles and materials of the NOx storage component are supported on the active alumina by bringing a solution containing Pt and the NOx storage component materials into contact with the support material and calcining the solution. The NOx storage component also includes K, Sr and Mg in addition to Ba.

—How to Prepare Ce-Based Mixed Oxide—

The above Ce-based mixed oxide is prepared by coprecipitation using respective solutions of Ce, Zr and Rh as source materials. Now, how to prepare the Ce-based mixed oxide will be described. First, respective predetermined amounts of zirconium oxynitrate, cerous nitrate and rhodium nitrate are mixed with water to make a total volume of 300 mL, and the mixed solution is stirred at room temperature for about an hour. Thereafter, the mixed solution is heated to 80° C. and then mixed with 50 mL of 28% aqueous ammonia, which has been prepared in another beaker, by adding the aqueous ammonia at a stroke while strongly and quickly stirring the mixed solution with a glass rod. The addition and mixing of the aqueous ammonia are completed within one second. The cloudy solution resulting from the mixture of aqueous ammonia is allowed to stand for a day and night to produce a cake, and the cake is centrifuged and well rinsed in water. The water-rinsed cake is dried by heating it at approximately 150° C., and then calcined under the condition of keeping it at 400° C. for five hours and then keeping it at 500° C. for two hours.

Since the Ce-based mixed oxide is produced by coprecipitation and thereby doped with Rh, Rh atoms are placed at crystal lattice points of the mixed oxide like Ce and Zr or, in other words, Rh atoms are strongly bonded to the mixed oxide. Otherwise, Rh atoms are placed between crystal lattice points of the mixed oxide. In either case, Rh atoms are dispersed uniformly on the surfaces and inside of crystallites of the mixed oxide. The Ce-based mixed oxide coprecipitated with Rh is hereinafter also referred to as a Rh-doped mixed oxide Rh—CeZrO.

Figure 4:
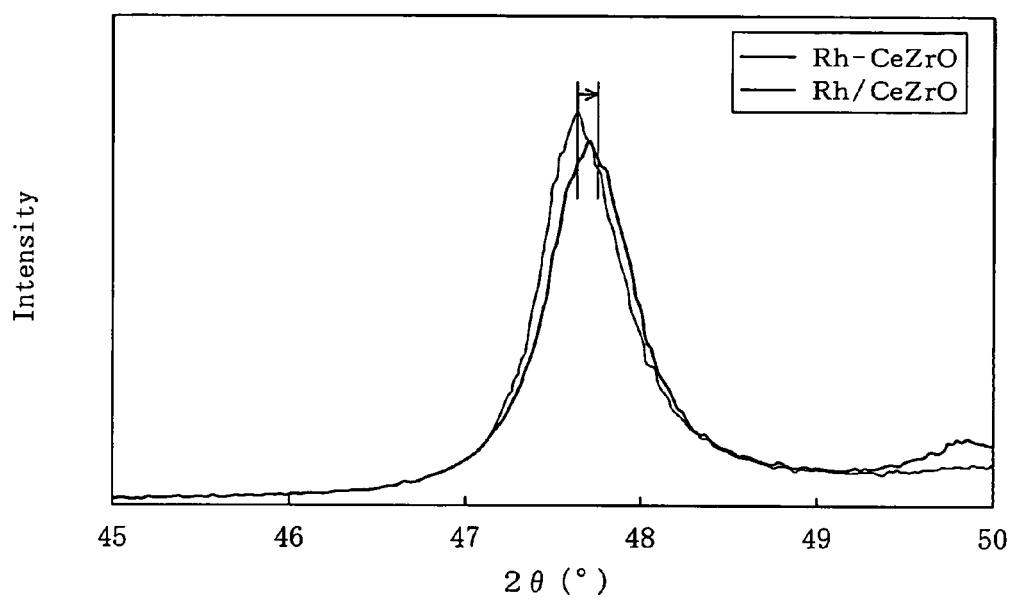
FIG. 4 is an XRD (X-ray Diffractometry) chart of Ce—Zr mixed oxide constituents in a Ce—Zr mixed oxide coprecipitated with Rh and an evaporatively dried Rh-supported Ce—Zr mixed oxide which were observed in terms of x-ray diffraction peak intensity.

The above Rh-doped mixed oxide Rh—CeZrO and an evaporatively dried Rh-supported Ce—Zr mixed oxide (hereinafter, referred to as a Rh-supported mixed oxide Rh/CeZrO) obtained by supporting Rh on a Ce—Zr mixed oxide by evaporation to dryness were subjected to aging, i.e., they were kept in a normal atmosphere at 900° C. for 24 hours. Then, their Ce—Zr mixed oxide constituents were measured in terms of x-ray diffraction peak intensity by x-ray diffractometry (XRD). The measurement results are shown in FIG. 4. In the figure, the Rh-doped mixed oxide Rh—CeZrO is an inventive example and the Rh-supported mixed oxide Rh/CeZrO is a comparative example. Both the mixed oxides were prepared so that CeO$_2$:ZrO$_2$=75:25 (mass ratio) and Rh=0.4 mass % hold.

FIG. 4 shows that the peak intensity of Ce—Zr mixed oxide constituent in Rh—CeZrO shifts towards higher angles as compared with that in Rh/CeZrO. This shift is recognized to be owing to that some of Ce atoms in the original Ce—Zr mixed oxide were replaced with Rh atoms having a smaller ion radius (0.86 angstroms) than Ce atoms (1.01 angstroms) so that the resultant Ce—Zr mixed oxide was reduced in lattice size. It can be understood from this that at least some of the Rh atoms are contained in crystallites of the resultant Rh-doped mixed oxide Rh—CeZrO.

Figure 5:
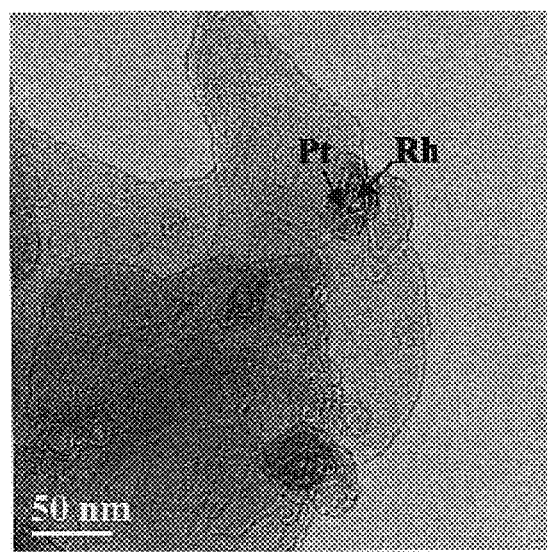
FIG. 5 is a TEM photograph of a catalyst in which Pt is supported on a Ce—Zr mixed oxide coprecipitated with Rh.

A Ce—Zr mixed oxide coprecipitated with Rh was prepared so that CeO$_2$:ZrO$_2$=75:25 (mass ratio) and Rh=0.074 mass % hold, and Pt particles were supported on the mixed oxide. The resultant Pt-supported, Rh-doped mixed oxide Pt/Rh—CeZrO was aged in a normal atmosphere at 900° C. for 24 hours. The mixed oxide Pt/Rh—CeZrO after the heat-aging was observed using a TEM (Transmission Electron Microscope). FIG. 5 is a photograph of the mixed oxide observed with the TEM. The existence of precious metals can be observed at a slightly dark site rightward of the center of the photograph. When the site was subjected to elementary analysis by EDAX (Energy Dispersive Analysis by X-ray), it could be recognized that Rh doped by coprecipitation and post-supported Pt exist at the site. From this, it can be understood that at least some of Rh atoms in each crystallite of the Ce—Zr mixed oxide are exposed at the crystallite surface.

—How to Prepare Catalyst of Example 1—

The catalyst is formed by first forming inner and outer coat layers on a support and supporting one or more kinds of catalytic metals and NOx storage component materials on both the coat layers by impregnation.

In forming the inner coat layer, active alumina, a Ce—Zr mixed oxide coprecipitated with Rh, and an alumina binder are first weighed and mixed so that the amounts of these materials to be supported on a unit quantity of support have respective predetermined values. Then, ion-exchange water is added to the mixture thereby preparing a slurry. The slurry is washcoated on the support by immersing the support in the slurry, picking it up from the slurry and then blowing out an excess amount of slurry. Next, the washcoated support is dried at 150° C. over an hour and then calcined at 450° C. over two hours, thereby forming an inner coat layer. Note that the conditions for the above drying and calcining processes are the same also in drying and calcining processes described later.

In forming an outer coat layer, a Rh-supported active alumina $Rh/Al_2O_3$ is first prepared as by evaporation to dryness or spray drying. Then, the Rh-supported active alumina $Rh/Al_2O_3$ and an alumina binder are weighed and mixed so that the amounts of these materials to be supported on a unit quantity of the support have respective predetermined values. Then, ion-exchange water is added to the mixture thereby preparing a slurry. The slurry is washcoated to the support on which the inner coat layer has been formed. Next, the washcoated support is dried and then calcined, thereby forming an outer coat layer.

Thereafter, a nitric acid solution of dinitro-diamine-platinum, an aqueous solution of barium acetate, an aqueous solution of potassium acetate, an aqueous solution of strontium acetate, and an aqueous solution of magnesium acetate are weighed and mixed so that the amounts of Pt, Ba, K, Sr and Mg to be supported on a unit quantity of the support have respective predetermined values, thereby preparing a mixed solution. The inner and outer coat layers on the support are impregnated with the above mixed solution, dried and calcined. In this respect, the total amount of these metals is controlled to have an impurity content of 1% or less with respect to the resultant catalyst.

Catalyst of Comparative Example 1

A catalyst of Comparative example 1 has a two-layer structure like the catalyst of Example 1. The catalyst of Comparative example 1 is different from the catalyst of Example 1 in that it employs, instead of a Ce—Zr mixed oxide coprecipitated with Rh, i.e., a Rh-doped mixed oxide Rh—CeZrO, a Rh-supported mixed oxide Rh/CeZrO obtained by supporting Rh on a Ce—Zr mixed oxide containing Ce and Zr by evaporation to dryness, but has the same chemical constituents except for the Ce—Zr mixed oxide.

Evaluation of Catalysts

—Catalysts Under Test—

A Rh-doped mixed oxide Rh—CeZrO and a Rh-supported mixed oxide Rh/CeZrO were prepared by the above-mentioned preparation method, and the mixed oxides were then used to prepare a catalyst of Example 1 and a catalyst of Comparative example 1, respectively. In this respect, the mixed oxide Rh—CeZrO and the mixed oxide Rh/CeZrO were prepared so that $CeO_2:ZrO_2=75:25$ (mass ratio) and Rh=0.074 mass % held. Table 1 shows respective supported amounts of chemical constituents of the resultant catalyst of Example 1, where the supported amount means the amount of that chemical constituent supported on 1 L of support (hereinafter the same). Note that words in the parenthesis in the "inner catalytic layer" column show the amount of Rh supported on the Rh-doped mixed oxide Rh—CeZrO and words in the parenthesis in the "outer catalytic layer" column show the amount of Rh supported on the support material $Rh/Al_2O_3$. The catalyst of Comparative example 1 has the same supported amounts of chemical constituents as the catalyst of Example 1, where the Rh-supported mixed oxide Rh/CeZrO is substituted for the Rh-doped mixed oxide in the catalyst of Example 1. The supports used were monolithic supports of cordierite.

TABLE 1

| | Constituents of layer | Constituents supported by impregnation |
|---|---|---|
| Outer catalytic layer | $Rh/Al_2O_3$ = 50 g/L (Rh = 0.2 g/L) | Pt = 1.5 g/L Ba = 30 g/L |
| Inner catalytic layer | Rh-CeZrO = 135 g/L $Al_2O_3$ = 135 g/L | K = 6 g/L Sr = 10g/L Mg = 10 g/L |

—Lean-NOx Conversion Measurement—

Each of the above catalysts was subjected to aging treatment in a normal atmosphere at 900° C. for 24 hours. Then, each catalyst was put in a fixed bed flow reactor. In the reactor, first, a simulated exhaust gas (gas composition A) having a lean air-fuel ratio was caused to flow for 60 seconds, and then, another simulated exhaust gas (gas composition B) having a rich air-fuel ratio was caused to flow for 60 seconds. After this cycle was repeated five times, the gas composition was changed from the rich air-fuel ratio to the lean air-fuel ratio. Further, measurements were made of the NOx conversion (lean-NOx conversion) for 60 seconds from that time point when the gas composition was changed to the lean air-fuel ratio. The gas compositions A and B are shown in Table 2. The space velocity SV was set at 25,000 $h^{-1}$. During the test, the temperature of each simulated exhaust gas at the catalyst entrance was set within the range from 250° C. to 500° C. inclusive.

TABLE 2

| | Gas composition A Lean (A/F = 22) | Gas composition B Rich (A/F = 14.5) |
|---|---|---|
| $HC(C_3H_6)$ | 1333 ppm | 1333 ppm |
| NO | 260 ppm | 260 ppm |
| CO | 0.16% | 0.16% |
| $CO_2$ | 9.75% | 9.75% |
| $H_2$ | 650 ppm | 650 ppm |
| $O_2$ | 7% | 0.5% |
| $N_2$ | remainder | remainder |

—Rich-HC Conversion Measurement—

Each of the above catalysts was subjected to aging treatment in a normal atmosphere at 900° C. for 24 hours. Then, each catalyst was put in a fixed bed flow reactor. In the reactor, a simulated exhaust gas (gas composition A) having a lean air-fuel ratio was caused to flow for 60 seconds, and then, another simulated exhaust gas (gas composition B) having a rich air-fuel ratio was caused to flow for 60 seconds. This cycle was repeated five times. Further, measurements were made of the HC conversion (rich-HC conversion) for 60 seconds under the simulated exhaust gas (gas composition B) having a rich air-fuel ratio in the fifth cycle. The conditions of catalyst temperature, simulated exhaust gas temperature and space velocity were the same as in the measurements of lean-NOx conversion. The gas compositions A and B are shown in Table 2.

—Measurement Results—

Figure 6:
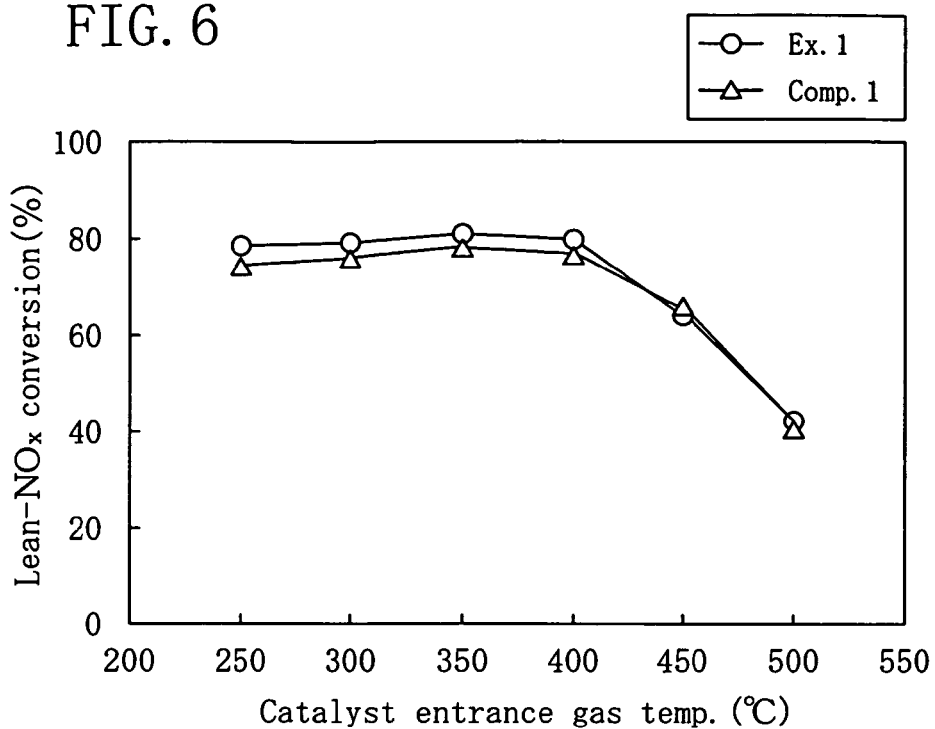
FIG. 6 is a graph showing the lean-NOx conversions of catalysts of Example 1 and Comparative example 1.
Figure 7:
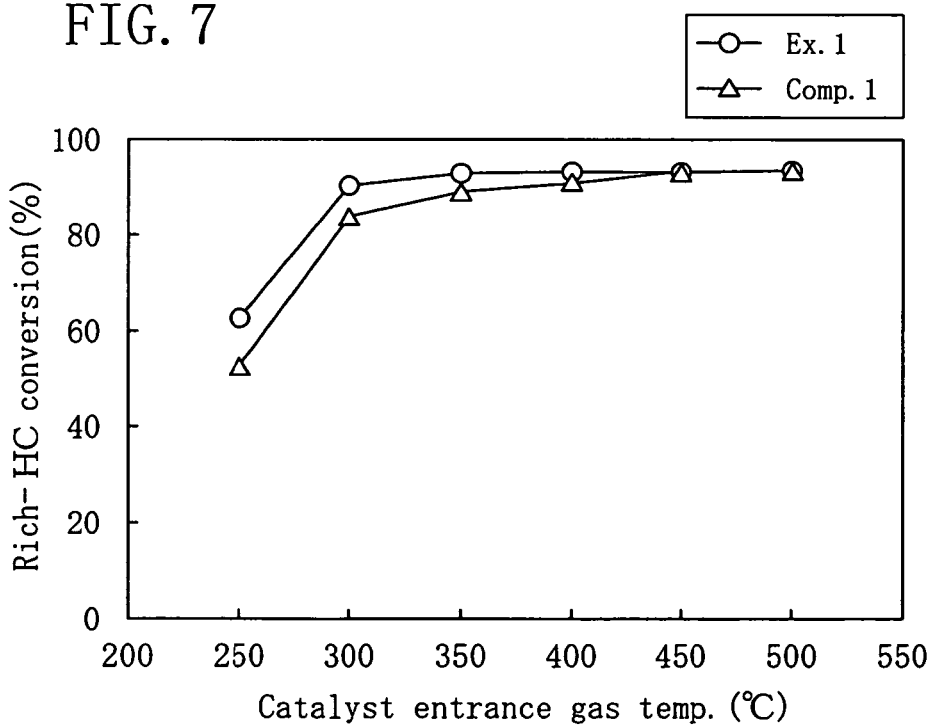
FIG. 7 is a graph showing the rich-HC conversions of the catalysts of Example 1 and Comparative example 1.

The measurement results for lean-NOx conversions of the above catalysts are shown in FIG. 6, and the measurement results for rich-HC conversions are shown in FIG. 7. Under the condition of 400° C. or less, the catalyst of Example 1 is higher than the catalyst of Comparative example 1 in respect of both the lean-NOx conversion and rich-HC conversion. It can be seen from this that when a Rh-doped mixed oxide Rh—CeZrO, i.e., a Ce-based mixed oxide with Rh atoms placed at and/or between crystal lattice points and exposed at the surface of each crystallite, is employed as an oxygen storage component, this improves the NOx storage capacity of the NOx storage component at lean air-fuel ratios and enhances the HC conversion at rich air-fuel ratios.

The reason why the catalyst of Example 1 exhibited high HC conversion is probably that the amounts of oxygen storage and release of the Rh-doped mixed oxide Rh—CeZrO are increased by virtue of Rh atoms inside crystallites thereof.

Figure 8:
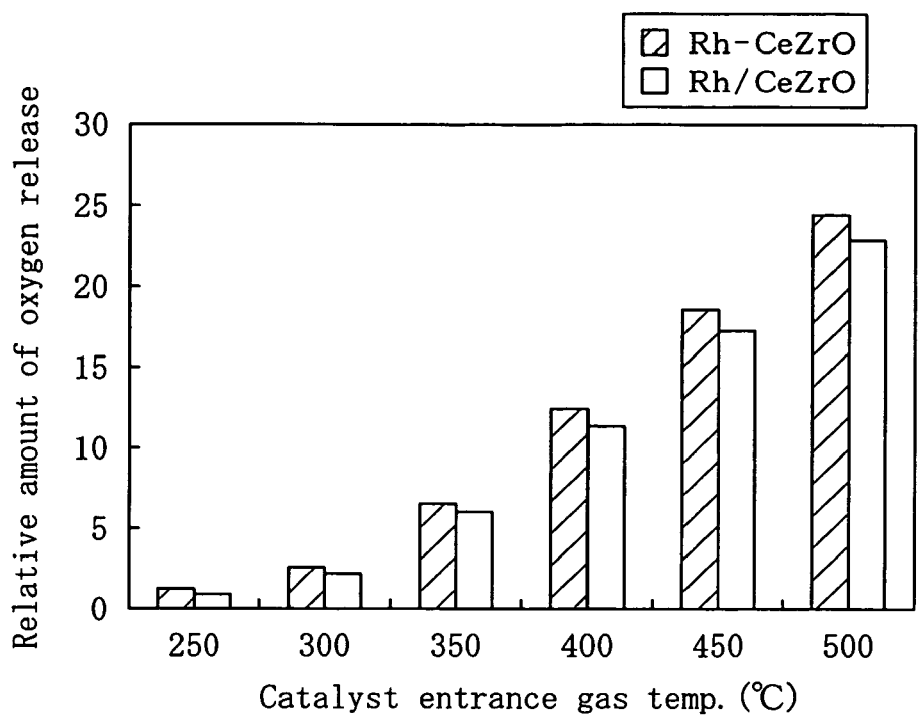
FIG. 8 is a graph showing the oxygen storage/release properties of the Ce—Zr mixed oxide coprecipitated with Rh and the evaporatively dried Rh-supported Ce—Zr mixed oxide.

FIG. 8 shows a comparison in oxygen storage/release property between the Rh-doped mixed oxide Rh—CeZrO and the Rh-supported mixed oxide Rh/CeZrO.

The evaluation of the oxygen storage/release property was made after each mixed oxide was coated on a honeycomb support and aged in a normal atmosphere at 900° C. for 24 hours. More specifically, each catalyst under test was put in a fixed bed flow reactor. In the reactor, each catalyst was subjected to repetitive cycles of treatment each consisting of circulation of CO gas (release of oxygen in each mixed oxide in the form of $CO_2$), circulation of $N_2$ gas, circulation of $O_2$ gas (storage of oxygen into the mixed oxide) and circulation of $N_2$ gas. During the cycles of treatment, the amount of oxygen released from each mixed oxide having stored oxygen was calculated from the amount of $CO_2$ produced during the circulation of CO gas. During the test, the gas temperature at the catalyst entrance was changed within the range from 250° C. to 500° C. inclusive.

In FIG. 8, the oxygen storage/release property is indicated as relative amounts of oxygen release by considering the amount of oxygen release of the Rh-supported mixed oxide Rh/CeZrO at 250° C. to be 1. At any temperatures for measurement from 250° C. to 500° C., the Rh-doped mixed oxide Rh—CeZrO of Example 1 has a larger amount of oxygen release than the Rh-supported mixed oxide Rh/CeZrO of Comparative example 1. This is probably because, with the Rh-doped mixed oxide Rh—CeZrO of Example 1, Rh atoms inside each crystallite facilitated the movement of oxygen within the crystallite.

As can be seen from the above, with the catalyst of Example 1, a large amount of oxygen is released from the Rh-doped mixed oxide Rh—CeZrO at rich air-fuel ratios, so that HC in the exhaust gas is more likely to be oxidized by Pt. This is demonstrated as the measurement results of rich HC conversion in FIG. 7.

Since HC oxidized by Pt at rich air-fuel ratios, particularly partly oxidized HC, serves as a reductant for NOx released from the NOx storage component, this efficiently expedites NOx reduction due to Pt and Rh in the Rh-doped mixed oxide Rh—CeZrO. As a result, NOx release from the NOx storage component is promoted, which enhances the NOx storage capacity of the NOx storage component at elevated oxygen concentrations in exhaust gas. One of reasons for high lean-NOx conversions of the catalyst of Example 1 as shown in FIG. 6 is probably that NOx release from the NOx storage component was promoted at rich air-fuel ratios as described above and therefore its NOx storage capacity at lean air-fuel ratios was increased.

The catalyst of Example 1 is a two-layer catalyst. However, the catalyst is not limited to the two-layer structure. The catalyst may have a single layer structure, for example, in which only the inner catalytic layer of the catalyst of Example 1 is formed on a honeycomb support, or may have a multi-layer structure, for example, which contains another or other catalytic layers in addition to the inner and outer catalytic layers of the catalyst of Example 1.

Catalysts of Example 2 and Comparative Example 2

—Structure of Catalytic Coating of Example 2—

A catalyst of Example 2 also has a two-layer structure as shown in FIG. 2. Its outer catalytic layer (precious metal-doped catalytic layer) 7 includes a first oxygen storage component and Rh-supported active alumina, i.e., $Rh/Al_2O_3$. The outer catalytic layer 7 further contains catalytic metals (or catalytic precious metals) and a NOx storage component such as Ba, which are supported on a support material consisting of the first oxygen storage component and $Rh/Al_2O_3$. The inner catalytic layer 6 includes a second oxygen storage component and a heat-proof inorganic oxide. The inner catalytic layer 6 further contains catalytic metals and a NOx storage component such as Ba, which are supported on a support material consisting of the second oxygen storage component and the heat-proof inorganic oxide. The heat-proof inorganic oxide is preferably active alumina.

The second oxygen storage component and active alumina in the inner catalytic layer 6 are mixed, and the mixture is adhered to the cell walls 5 of the support using a binder. The first oxygen storage component and $Rh/Al_2O_3$ in the outer catalytic layer 7 are mixed, and the mixture is adhered to the inner catalytic layer 6 using a binder.

The first oxygen storage component is preferably a Ce-based mixed oxide in which Ce atoms are placed at crystal lattice points of the mixed oxide and Rh atoms are placed at and/or between crystal lattice points thereof, like the oxygen storage component in Example 1. The Ce-based mixed oxide is preferably a Ce—Zr mixed oxide in which Ce atoms and Zr atoms are placed at its crystal lattice points. In each of crystallites of the Ce-based mixed oxide, some of Rh atoms are exposed at the crystallite surface and the rest exist inside the crystallite. Such a first oxygen storage component can be prepared by coprecipitation like the oxygen storage component in Example 1, and is preferably a Ce—Zr mixed oxide coprecipitated with Rh as described earlier.

The second oxygen storage component is preferably a Ce—Pr mixed oxide in which Ce atoms and Pr atoms are placed at its crystal lattice points.

In this example, two kinds of catalytic metals are supported on each of the support material (the second oxygen storage component and active alumina) in the inner catalytic layer 6 and the support material (the first oxygen storage component and $Rh/Al_2O_3$) in the outer catalytic layer 7. One of the two catalytic metals is Pt and the other is Rh. Further, in addition to Ba, NOx storage component materials of K, Sr and Mg are preferably supported on each of the support materials. These catalytic metals and NOx storage component materials are supported on each support material by bringing a solution containing these metals and NOx storage component materials into contact with the support material and calcining the solution.

—Second Oxygen Storage Component—

Barium carbonate $BaCO_3$ was supported on a Ce—Pr mixed oxide of $CeO_2:Pr_6O_{11}=90:10$ (mass ratio) prepared by coprecipitation, thereby forming a $BaCO_3$-supported Ce—Pr mixed oxide Ba/Ce—Pr. Likewise, $BaCO_3$ was supported on a Ce—Zr mixed oxide of $CeO_2:ZrO_2=75:25$ (mass ratio) prepared by coprecipitation, thereby forming a $BaCO_3$-supported Ce—Zr mixed oxide Ba/Ce—Zr. These $BaCO_3$-supported mixed oxides were examined for ionization potential of Ba atoms by XPS (X-ray Photoelectron Spectroscopy). The system used for examination was ESCA 5600Ci by ULVAC-PHI Inc. The examination results are shown in FIG. 9, where the ionization potential of Ba atoms in $BaCO_3$ only is considered as a reference value, 0 eV.

Figure 9:
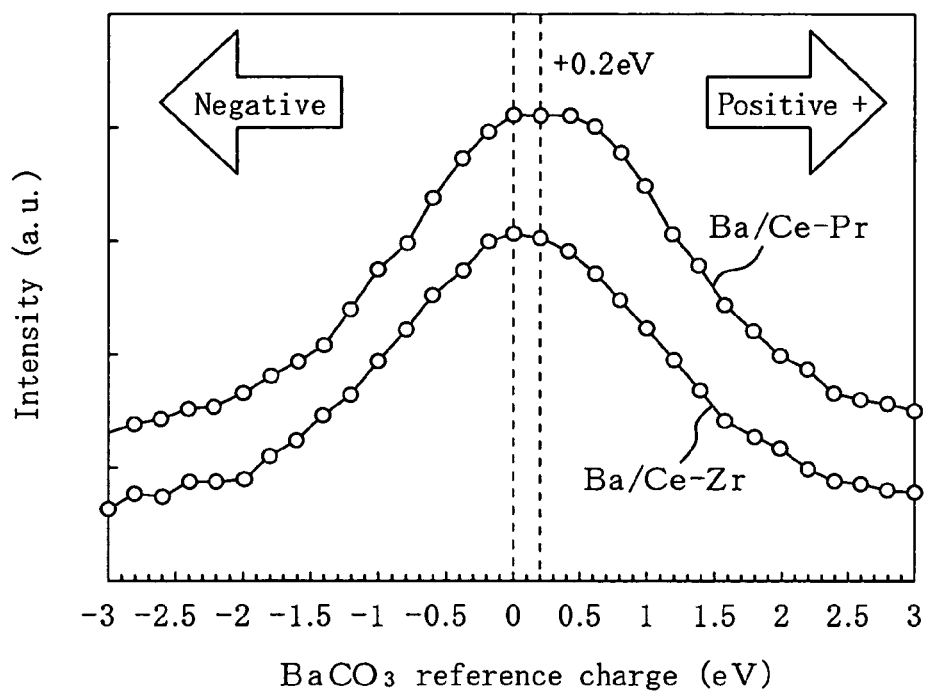
FIG. 9 is a graph showing a comparison in ionization potential between Ba atoms contained in a substance (Ba/Ce—Pr) obtained by supporting $BaCO_3$ on a Ce—Pr mixed oxide and Ba atoms contained in a substance (Ba/Ce—Zr) obtained by supporting $BaCO_3$ on a Ce—Zr mixed oxide.

As can be seen from the graph of FIG. 9, the peak intensity value for Ba/Ce—Zr is almost matched with the reference value, whereas the peak value for Ba/Ce—Pr is +0.2 eV off the reference value to the "Positive+" side. In other words, the $BaCO_3$-supported Ce—Pr mixed oxide has higher ionization potential of Ba atoms. This means that the extent to which Ba is positively charged is greater.

Figure 10A:
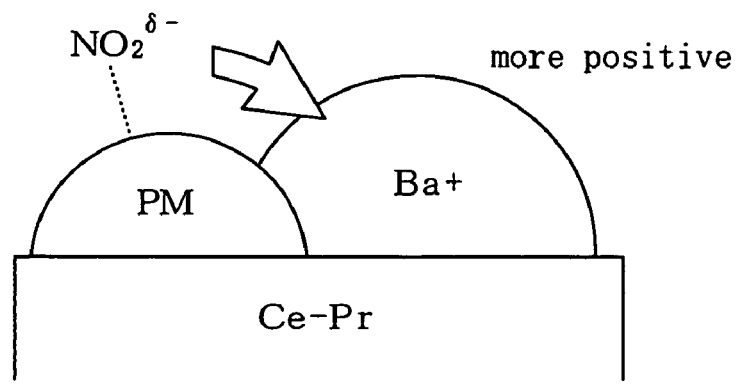
FIG. 10A is a diagram showing the NOx storage mechanism of a catalyst using a Ce—Pr mixed oxide.
Figure 10B:
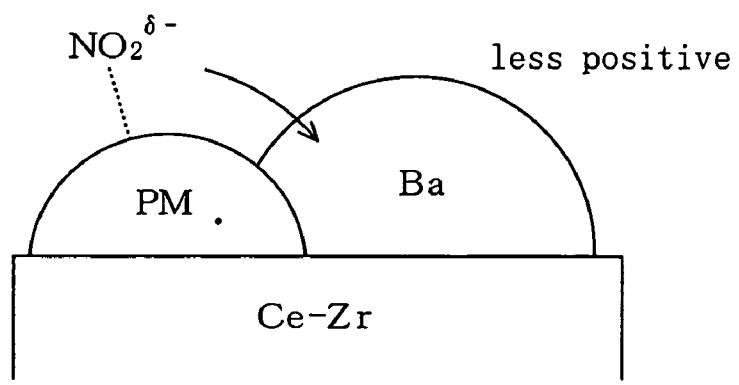
FIG. 10B is a diagram showing the NOx storage mechanism of a catalyst using a Ce—Zr mixed oxide.

Therefore, as shown in respect of ease of spill-over by the arrow width in FIGS. 10A and 10B, it can be said that, with Ba/Ce—Pr (FIG. 10A), Ba is more easily charged positively than Ba/Ce—Zr (FIG. 10B) and its reaction intermediates $NO_2^{\delta-}$ correspondingly easily spill over from catalytic precious metal (PM) onto Ba serving as a NOx storage component, and that, in other words, when a Ce—Pr mixed oxide is used as an oxygen storage component, NOx storage due to the NOx storage mechanism as described earlier easily occurs.

—Comparison of Oxygen Storage Property Between Inner and Outer Catalytic Layers—

A Ce—Zr mixed oxide coprecipitated with Rh (also referred to as a Rh-doped mixed oxide Rh—CeZrO) was prepared as an oxygen storage component for an outer catalytic layer so that $CeO_2:ZrO_2=75:25$ (mass ratio) and Rh=0.4 mass % held. On the other hand, a Ce—Pr mixed oxide was prepared by coprecipitation so that $CeO_2:Pr_6O_{11}=90:10$ (mass ratio) held, and Pt and Rh were supported on the Ce—Pr mixed oxide to constitute 0.3 mass % and 0.03 mass %, respectively, thereby preparing an evaporatively dried Pt and Rh-supported Ce—Pr mixed oxide (also referred to as a Pt, Rh-supported mixed oxide Pt—Rh/CePrO). The resultant mixed oxides were aged at 900° C. for 24 hours in a normal atmosphere and then determined for the amount of oxygen release by TPD (Temperature Programmed Desorption).

More specifically, respective test pieces of the above mixed oxides after aged were subjected to a pretreatment of exposure to an oxygen-containing gas (20 mass % of which is oxygen and the rest is helium) at gradually increasing temperatures from room temperature to 600° C., and the temperature was then decreased down to room temperature. Thereafter, the test pieces were subjected to a treatment of exposure of a CO-containing gas (2 mass % of which is CO and the rest is helium) at gradually increasing temperatures from room temperature to 600° C., and the amounts of oxygen release of the test pieces were determined from the respective amounts of $CO_2$ release thereof during the exposure of the CO-containing gas. The determination results are shown in Table 3 as relative amounts of oxygen release by considering the amount of oxygen release of the Pt, Rh-supported mixed oxide Pt—Rh/CePrO at 250° C. to be 1.

TABLE 3

|  | Relative amount of oxygen release | | |
| --- | --- | --- | --- |
|  | 250° C. | 350° C. | 450° C. |
| Rh-CeZrO (outer catalytic layer) | 1.48 | 2.63 | 1.76 |
| Pt-Rh/CePrO (inner catalytic layer) | 1 | 1.01 | 1.08 |

As can be seen from Table 3, the outer catalytic layer has an oxygen storage property that the peak of amount of oxygen release appears in a particular temperature range (in the vicinity of 350° C. (within the range from 300° C. to 400° C.)), and the inner catalytic layer has an oxygen storage property that the amount of oxygen release is less affected by the temperature change over a wide temperature range from lower to higher temperatures than the particular temperature range as compared with the outer catalytic layer.

The relative amount of oxygen release of Rh—CeZrO increases with increasing temperature in FIG. 8, whereas the peak of amount of oxygen release of Rh—CeZrO appears in the particular temperature range in Table 3. This is due to the difference in measurement method. Specifically, in the method of FIG. 8, each mixed oxide was subjected to repetitive cycles of treatment each consisting of circulation of CO gas, circulation of $N_2$ gas, circulation of $O_2$ gas and circulation of $N_2$ gas, while being kept at the individual temperature indicated in the figure. During the cycles of treatment, the amount of oxygen released from each mixed oxide was calculated from the amount of $CO_2$ produced during the circulation of CO gas. On the other hand, in the method of Table 3, the circulation of CO-containing gas was carried out while the temperature of each mixed oxide was gradually increased from room temperature. Therefore, each mixed oxide gradually released oxygen having stored at room temperature, which brought the peak of amount of oxygen release into existence. In this relation, it can be presumed from the results of Table 3 that the peak of amount of oxygen release of Pt—Rh/CePrO will appear in the vicinity of or at a slightly larger temperature than 450° C.

—How to Prepare Catalyst of Example 2—

The catalyst is formed by first forming inner and outer coat layers on a support and supporting one or more kinds of catalytic metals and NOx storage component materials on both the coat layers by impregnation.

In forming the inner coat layer, active alumina, a Ce—Pr mixed oxide and an alumina binder are first weighed and mixed so that the amounts of these materials to be supported on a unit quantity of support have respective predetermined values. Then, ion-exchange water is added to the mixture thereby preparing a slurry. The slurry is washcoated on the support by immersing the support in the slurry, picking it up from the slurry and then blowing out an excess amount of slurry. Next, the washcoated support is dried at 150° C. over an hour and then calcined at 450° C. over two hours, thereby forming an inner coat layer. Note that the conditions for the above drying and calcining processes are the same also in drying and calcining processes described later.

In forming an outer coat layer, a Rh-supported active alumina $Rh/Al_2O_3$ is first prepared as by evaporation to dryness or spray drying. Then, the Rh-supported active alumina $Rh/Al_2O_3$, a Ce—Zr mixed oxide coprecipitated with Rh and an alumina binder are weighed and mixed so that the amounts of these materials to be supported on a unit quantity of the support have respective predetermined values. Then, ion-exchange water is added to the mixture thereby preparing a slurry. The slurry is washcoated to the support on which the inner coat layer has been formed. Next, the washcoated support is dried and then calcined, thereby forming an outer coat layer.

Thereafter, a nitric acid solution of dinitro-diamine-platinum, an aqueous solution of rhodium nitrate, an aqueous solution of barium acetate, an aqueous solution of potassium acetate, an aqueous solution of strontium acetate, and an aqueous solution of magnesium acetate are weighed and mixed so that the amounts of Pt, Ba, K, Sr and Mg to be supported on a unit quantity of the support have respective predetermined values, thereby preparing a mixed solution. The inner and outer coat layers on the support are impregnated with the above mixed solution, dried and calcined. In this respect, the total amount of these metals is controlled to have an impurity content of 1% or less with respect to the resultant catalyst.

Catalyst of Comparative Example 2

A catalyst of Comparative example 2 has a two-layer structure like the catalyst of Example 2. The catalyst of Comparative example 2 is different from the catalyst of Example 2 in that it employs, instead of a Ce—Zr mixed oxide coprecipitated with Rh, i.e., a Rh-doped mixed oxide Rh—CeZrO, a Rh-supported mixed oxide Rh/CeZrO obtained by supporting Rh on a Ce—Zr mixed oxide containing Ce and Zr by evaporation to dryness, but has the same chemical constituents except for the Ce—Zr mixed oxide.

Evaluation of Catalysts

—Catalysts Under Test—

A Rh-doped mixed oxide Rh—CeZrO, a Rh-supported mixed oxide Rh/CeZrO, a Ce—Pr mixed oxide CePrO and a Rh-supported active alumina $Rh/Al_2O_3$ were prepared and then used to prepare a catalyst of Example 2 and a catalyst of Comparative example 2. In this respect, the mixed oxide Rh—CeZrO and the mixed oxide Rh/CeZrO were prepared so that $CeO_2:ZrO_2=75:25$ (mass ratio) and Rh=0.4 mass % held. The Ce—Pr mixed oxide CePrO was prepared so that $CeO_2:Pr_6O_{11}=90:10$ (mass ratio) held. The Rh-supported active alumina $Rh/Al_2O_3$ was prepared so that Rh=0.4 mass % held.

Table 4 shows respective supported amounts of chemical constituents of the resultant catalyst of Example 2. Note that words in each parenthesis in the "outer catalytic layer" column show the amount of Rh supported on the chemical constituent described in the line just above. The catalyst of Comparative example 2 has the same supported amounts of chemical constituents as the catalyst of Example 2, where the Rh-supported mixed oxide Rh/CeZrO is substituted for the Rh-doped mixed oxide Rh—CeZrO in the catalyst of Example 2. The supports used were monolithic supports of cordierite.

TABLE 4

| | Constituents of layer | Constituents supported by impregnation |
|---|---|---|
| Outer catalytic layer | Rh-CeZrO = 25 g/L | Pt = 1 g/L |
| | (Rh = 0.1 g/L) | Rh = 0.1 g/L |
| | $(Rh/Al_2O_{3-25\,g/L})$ | Ba = 30 g/L |
| | (Rh = 0.1 g/L) | K = 6 g/L |
| Inner catalytic layer | CePrO = 135 g/L | Sr = 10 g/L |
| | $Al_2O_{3-135\,g/L}$ | Mg = 10 g/L |

—Conversion Measurement—

Each of the above catalysts was subjected to aging treatment in a normal atmosphere at 900° C. for 24 hours. Then, each catalyst was put in a fixed bed flow reactor. In the reactor, first, a simulated exhaust gas (gas composition A) having a lean air-fuel ratio shown in Table 2 was caused to flow for 60 seconds, and then, another simulated exhaust gas (gas composition B) having a rich air-fuel ratio shown in Table 2 was caused to flow for 60 seconds. After this cycle was repeated five times, measurements were made of the lean-NOx conversion for 60 seconds from the time point when the gas composition was changed from the rich air-fuel ratio to the lean air-fuel ratio. Further, measurements were also made of the rich-HC conversion and rich-NOx conversion for 60 seconds from the time point when the gas composition was changed from the lean air-fuel ratio to the rich air-fuel ratio. The space velocity SV was set at 25,000 $h^{-1}$. During the test, the temperature of each simulated exhaust gas at the catalyst entrance was set within the range from 250° C. to 500° C. inclusive.

—Measurement Results—

Figure 11:
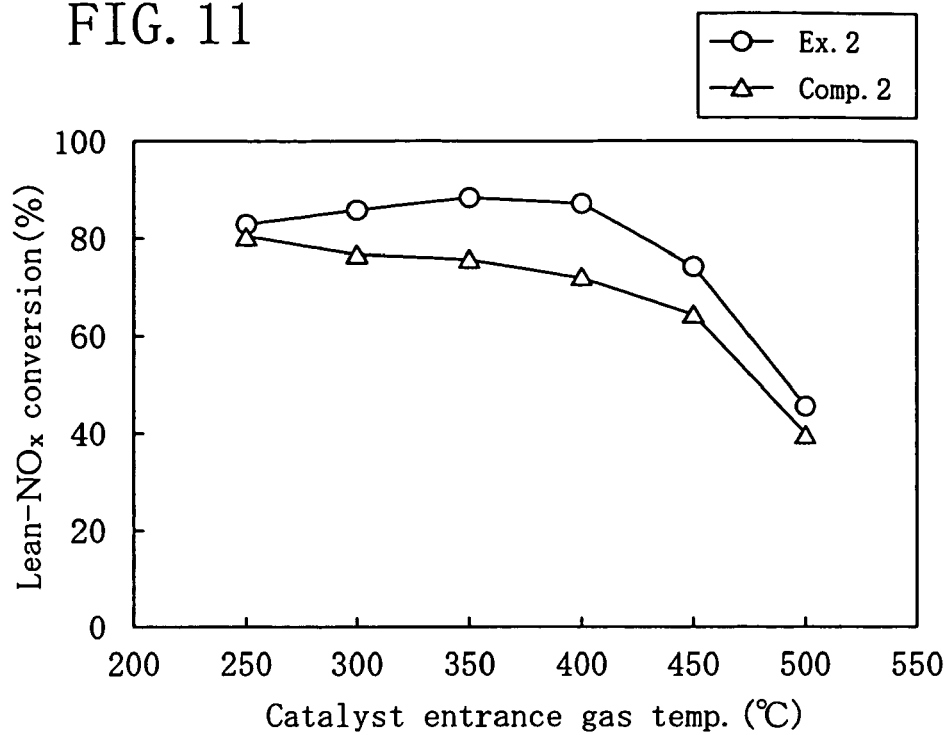
FIG. 11 is a graph showing the lean-NOx conversions of catalysts of Example 2 and Comparative example 2.
Figure 12:
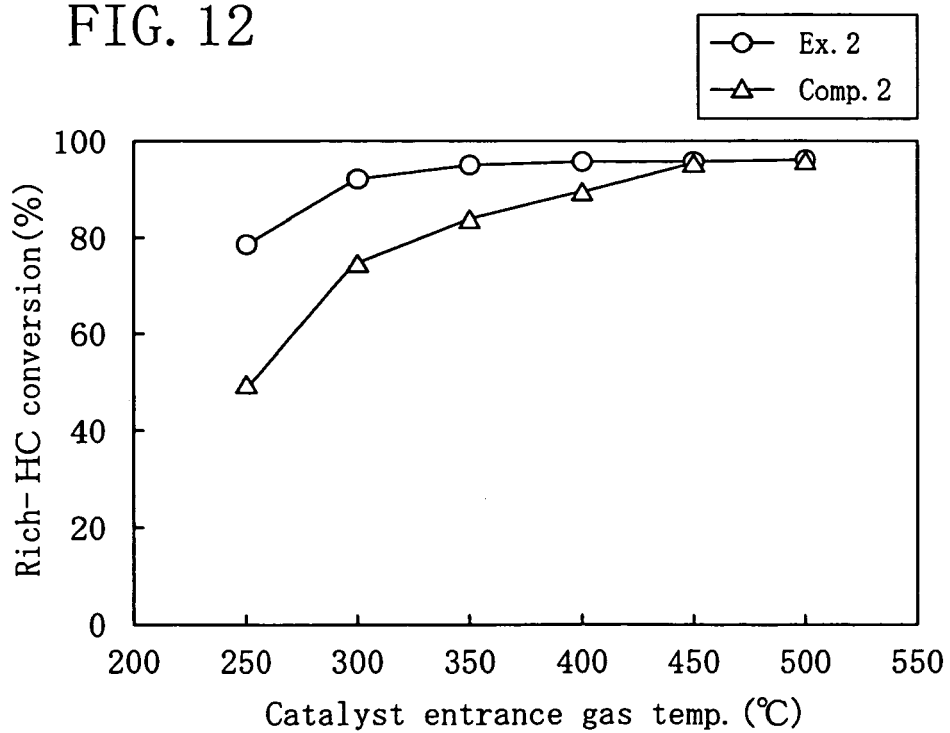
FIG. 12 is a graph showing the rich-HC conversions of the catalysts of Example 2 and Comparative example 2.
Figure 13:
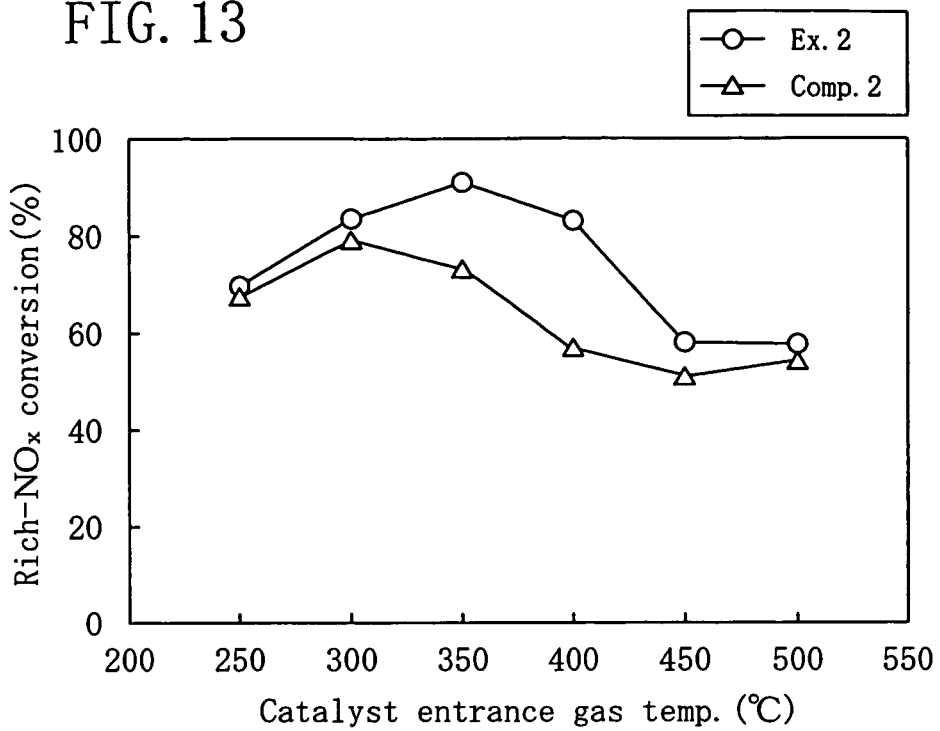
FIG. 13 is a graph showing the rich-NOx conversions of the catalysts of Example 2 and Comparative example 2.

The measurement results for lean-NOx conversion of the above catalysts are shown in FIG. 11, the measurement results for rich-HC conversion are shown in FIG. 12, and the measurement results for rich-NOx conversion are shown in FIG. 13. The catalyst of Example 2 is higher in all of the conversions than the catalyst of Comparative example 2. It can be seen from this that when a Rh-doped mixed oxide Rh—CeZrO, i.e., a Ce-based mixed oxide with Rh atoms placed at and/or between crystal lattice points and exposed at the surface of each crystallite, is employed as an oxygen storage component, this improves the NOx storage capacity of the NOx storage component at lean air-fuel ratios and enhances the HC and NOx conversions at rich air-fuel ratios.

The reason for the increased HC conversion of the catalyst of Example 2 is probably that the amounts of oxygen storage and release of the Rh-doped mixed oxide Rh—CeZrO are increased by virtue of Rh atoms inside crystallites thereof.

Figure 14:
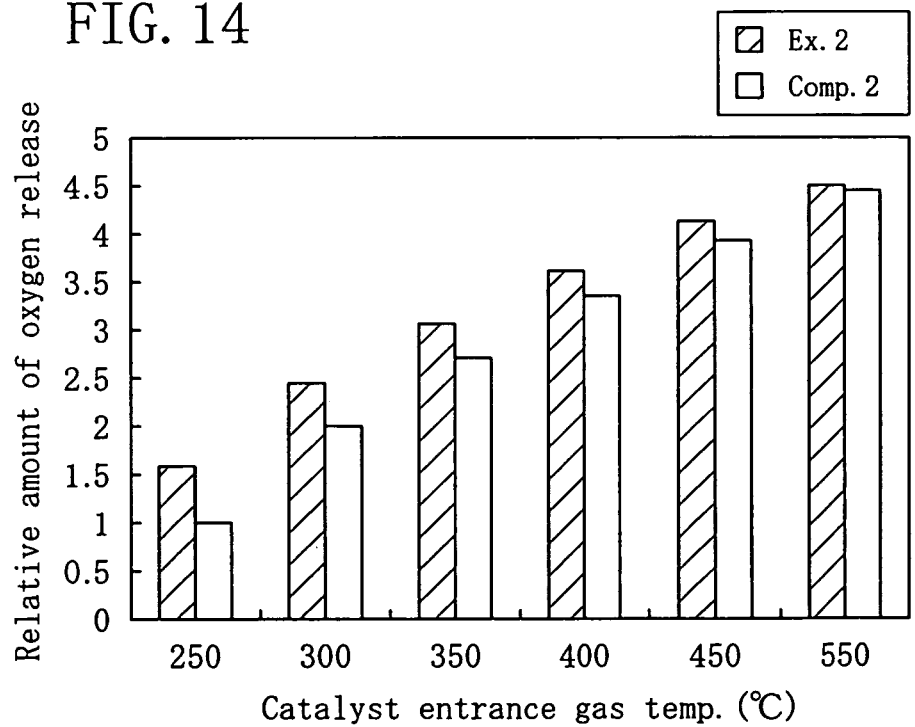
FIG. 14 is a graph showing the oxygen storage/release property of the catalysts of Example 2 and Comparative example 2.

FIG. 14 shows a comparison in oxygen storage/release property between both the catalysts of Example 2 and Comparative example 2. The evaluation of the oxygen storage/release property was made after aging in a normal atmosphere at 900° C. for 24 hours. More specifically, each catalyst was put in a fixed bed flow reactor. In the reactor, each catalyst was subjected to repetitive cycles of treatment each consisting of circulation of CO gas (release of oxygen in each mixed oxide in the form of $CO_2$), circulation of $N_2$ gas, circulation of $O_2$ gas (storage of oxygen into the mixed oxide) and circulation of $N_2$ gas. During the cycles of treatment, the amount of oxygen released from each catalyst having stored oxygen was calculated from the amount of $CO_2$ produced during the circulation of CO gas. During the test, the gas temperature at the catalyst entrance was changed within the range from 250° C. to 500° C. inclusive.

Note that in the evaluation of the oxygen storage/release property shown in FIG. 14, the amounts of oxygen release were calculated not by using mixed oxides only but as the catalysts of Example 2 and Comparative example 2, i.e., in the form of catalysts containing not only mixed oxides but also other components. However, Example 2 has the same components as Comparative example 2 except for one of the mixed oxides serving as oxygen storage components and the oxidation of CO to $CO_2$ depends on active oxygen released from the mixed oxides. Therefore, it is no problem to evaluate the oxygen storage/release property of mixed oxides in the form of a catalyst, as in this case.

In FIG. 14, the oxygen storage/release property is indicated as relative amounts of oxygen release by considering the amount of oxygen release of the catalyst of Comparative example 2 at 250° C. to be 1. At any temperatures for measurement from 250° C. to 500° C., the catalyst of Example 2 has a larger amount of oxygen release than the catalyst of Comparative example 2. This is probably because, with the Rh-doped mixed oxide Rh—CeZrO in the catalyst of Example 2, Rh atoms inside each crystallite facilitated the movement of oxygen within the crystallite.

As can be seen from the above, with the catalyst of Example 2, a large amount of oxygen is released from the Rh-doped mixed oxide Rh—CeZrO at rich air-fuel ratios, so that HC in the exhaust gas is more likely to be oxidized by Pt. This is demonstrated as the measurement results of rich HC conversion in FIG. 12.

Since HC oxidized by Pt at rich air-fuel ratios, particularly partly oxidized HC, serves as a reductant for NOx released from the NOx storage component, this efficiently expedites NOx reduction due to Pt and Rh in the Rh-doped mixed oxide Rh—CeZrO. Therefore, the rich-NOx conversion of the catalyst of Example 2 is high as shown in FIG. 13. As a result, NOx release from the NOx storage component is promoted, which enhances the NOx storage capacity of the NOx storage component at elevated oxygen concentrations in exhaust gas. One of reasons for high lean NOx conversions of the catalyst of Example 2 as shown in FIG. 11 is probably that NOx release from the NOx storage component was promoted at rich air-fuel ratios as described above and therefore its NOx storage capacity at lean air-fuel ratios was increased.

The catalyst of Example 2 is a two-layer catalyst. However, the catalyst is not limited to the two-layer structure. The catalyst may have a single layer structure, for example, in which only the inner catalytic layer of the catalyst of Example 2 is formed on a honeycomb support, or may have a multi-layer structure, for example, which contains another or other catalytic layers in addition to the inner and outer catalytic layers of the catalyst of Example 2.

Catalysts of Example 3 and Comparative Example 3

—Structure of Catalytic Coating of Example 3—

A catalyst of Example 3 also has a two-layer structure as shown in FIG. 2. The inner catalytic layer 6 is a precious metal-doped catalytic layer that contains a Ce-based mixed oxide in which atoms of plural kinds of catalytic precious metals are placed at and/or between crystal lattice points of the mixed oxide, and a NOx storage component such as Ba. The outer catalytic layer 7 contains the same and/or different kind of catalytic metal or kinds of catalytic metals and a NOx storage component such as Ba, which are supported on a support material made of a heat-proof inorganic oxide.

More specifically, atoms of a catalytic precious metal placed at and/or between crystal lattice points of each of crystallites constituting the Ce-based mixed oxide in the inner catalytic layer 6 are Pt atoms. In each crystallite of the Ce-based mixed oxide, some of the Pt atoms are exposed at the crystallite surface. The inner catalytic layer 6 also contains a support material made of a heat-proof inorganic oxide, and other catalytic metals (or catalytic precious metals) other than Pt atoms placed at and/or between crystal lattice points of each crystallite of the mixed oxide. The Ce-based mixed oxide and the support material are mixed, and the mixture is adhered to the cell walls 5 using a binder.

The other catalytic metals are supported to the support material and the Ce-based mixed oxide by bringing a solution containing the catalytic metals into contact with them and calcining the solution. The NOx storage component is also supported to the support material and the Ce-based mixed oxide by bringing a solution containing materials of the NOx storage component into contact with them and calcining the solution.

The other catalytic metals supported are Pt and Rh. The support material is active alumina. The NOx storage component includes K, Sr and Mg in addition to Ba.

On the other hand, in the outer catalytic layer 7, the support material is active alumina likewise, and Rh is supported on the active alumina. The Rh-supported active alumina ($Rh/Al_2O_3$) is adhered to the inner catalytic layer 6 using a binder. Pt particles and materials of the NOx storage component are supported on the active alumina by bringing a solution containing Pt and the NOx storage component materials into contact with the support material and calcining the solution. The NOx storage component also includes K, Sr and Mg in addition to Ba.

—How to Prepare Ce-Based Mixed Oxide—

The above Ce-based mixed oxide is prepared by coprecipitation using respective solutions of Ce, Zr and Pt as source materials. Now, how to prepare the Ce-based mixed oxide will be described. First, respective predetermined amounts of zirconium oxynitrate, cerous nitrate and a nitric acid solution of dinitro-diamine-platinum are mixed with water to make a total volume of 300 mL, and the mixed solution is stirred at room temperature for about an hour. Thereafter, the mixed solution is heated to 80° C. and then mixed with 50 mL of 28% aqueous ammonia, which has been prepared in another beaker, by adding the aqueous ammonia at a stroke while strongly and quickly stirring the mixed solution with a glass rod. The addition and mixing of the aqueous ammonia are completed within one second. The cloudy solution resulting from the mixture of aqueous ammonia is allowed to stand for a day and night to produce a cake, and the cake is centrifuged and well rinsed in water. The water-rinsed cake is dried by heating it at approximately 150° C., and then calcined under the condition of keeping it at 400° C. for five hours and then keeping it at 500° C. for two hours.

Since the Ce-based mixed oxide is produced by coprecipitation and thereby doped with Pt, Pt atoms are placed at crystal lattice points of the mixed oxide like Ce and Zr or, in other words, Pt atoms are strongly bonded to the mixed oxide. Otherwise, Pt atoms are placed between crystal lattice points of the mixed oxide. In either case, Pt atoms are dispersed uniformly on the surfaces and inside of crystallites of the mixed oxide, and some of the Pt atoms are exposed at the crystallite surface.

Figure 15:
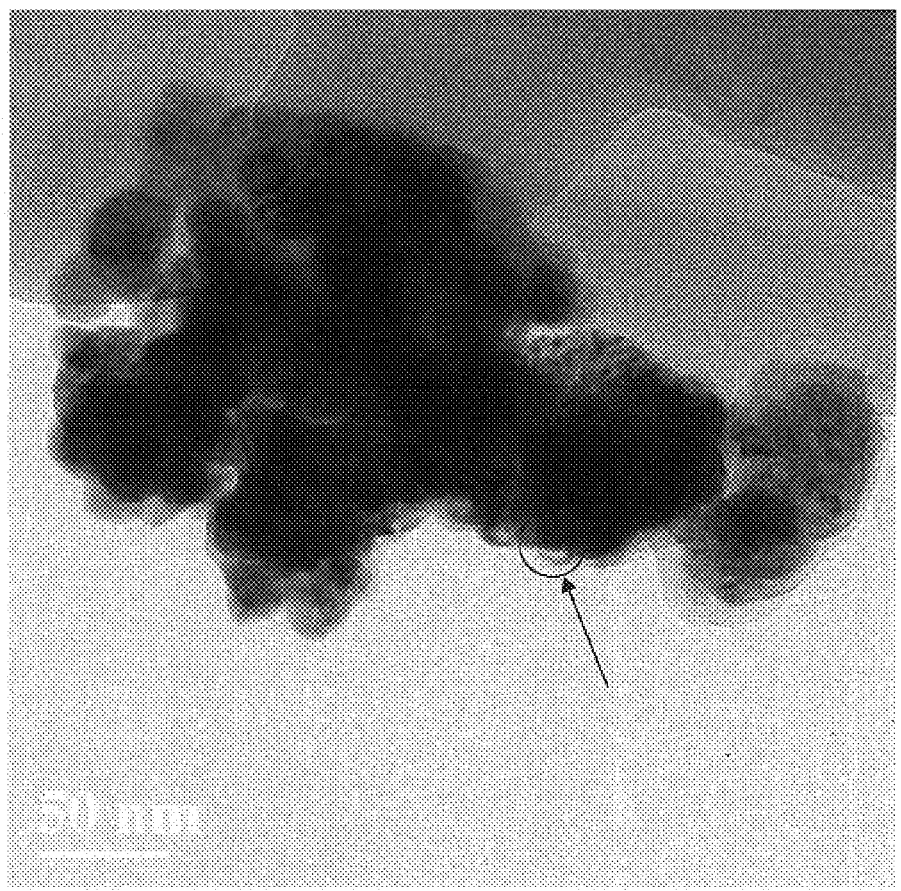
FIG. 15 is a TEM photograph of a Ce—Zr mixed oxide coprecipitated with Pt.

FIG. 15 is a photograph of a Ce-based mixed oxide prepared so that $CeO_2:ZrO_2=75:25$ (mass ratio) and Pt=0.37 mass % hold and observed with a TEM (Transmission Electron Microscope). The existence of a particle (crystallite) can be recognized in the circle of the photograph. Further, it can be recognized that Pt atoms appear in the form of black dots in the particle. When the part in the circle was subjected to elementary analysis by EDAX (Energy Dispersive Analysis by X-ray), it could be determined that Pt:Ce:Zr=0.4:68:31.6 (atomic percent). The Ce-based mixed oxide coprecipitated with Pt is hereinafter also referred to as a Pt-doped mixed oxide Pt—CeZrO.

—How to Prepare Catalyst of Example 3—

The catalyst is formed by first forming inner and outer coat layers on a support and supporting one or more kinds of catalytic metals and NOx storage component materials on both the coat layers by impregnation.

In forming the inner coat layer, active alumina, a Ce—Zr mixed oxide coprecipitated with Pt, and an alumina binder are first weighed and mixed so that the amounts of these materials to be supported on a unit quantity of support have respective predetermined values. Then, ion-exchange water is added to the mixture thereby preparing a slurry. The slurry is washcoated on the support by immersing the support in the slurry, picking it up from the slurry and then blowing out an excess amount of slurry. Next, the washcoated support is dried at 150° C. over an hour and then calcined at 450° C. over two hours, thereby forming an inner coat layer. Note that the conditions for the above drying and calcining processes are the same also in drying and calcining processes described later.

In forming an outer coat layer, a Rh-supported active alumina Rh/Al$_2$O$_3$ is first prepared as by evaporation to dryness or spray drying. Then, the Rh-supported active alumina Rh/Al$_2$O$_3$ and an alumina binder are weighed and mixed so that the amounts of these materials to be supported on a unit quantity of the support have respective predetermined values. Then, ion-exchange water is added to the mixture thereby preparing a slurry. The slurry is washcoated to the support on which the inner coat layer has been formed. Next, the washcoated support is dried and then calcined, thereby forming an outer coat layer.

Thereafter, a nitric acid solution of dinitro-diamine-platinum, an aqueous solution of rhodium acetate, an aqueous solution of barium acetate, an aqueous solution of potassium acetate, an aqueous solution of strontium acetate, and an aqueous solution of magnesium acetate are weighed and mixed so that the amounts of Pt, Rh, Ba, K, Sr and Mg to be supported on a unit quantity of the support have respective predetermined values, thereby preparing a mixed solution. The inner and outer coat layers on the support are impregnated with the above mixed solution, dried and calcined. In this respect, the total amount of these metals is controlled to have an impurity content of 1% or less with respect to the resultant catalyst. In preparing a mixed solution, rhodium nitrate can be substituted for rhodium acetate.

Catalyst of Comparative Example 3

A catalyst of Comparative example 3 has a two-layer structure like the catalyst of Example 3. The catalyst of Comparative example 3 is different from the catalyst of Example 3 in that it employs, instead of a Pt-doped mixed oxide Pt—CeZrO in which Pt atoms are place at and/or between crystal lattice points of the Ce—Zr mixed oxide, a Pt-supported mixed oxide Pt/CeZrO obtained by supporting Pt on a Ce—Zr mixed oxide containing Ce and Zr by evaporation to dryness, but has the same chemical constituents except for the Ce—Zr mixed oxide.

Evaluation of Catalysts

—Catalysts Under Test—

A catalyst of Example 3 and a catalyst of Comparative example 3 were prepared by the above-mentioned preparation method. Table 5 shows respective supported amounts of chemical constituents of the resultant catalyst of Example 3. Note that words in the parenthesis in the "inner catalytic layer" column show the amount of Pt supported on the Pt-doped mixed oxide Pt—CeZrO and words in the parenthesis in the "outer catalytic layer" column show the amount of Rh supported on the support material Rh/Al$_2$O$_3$. The catalyst of Comparative example 3 has the same supported amounts of chemical constituents as the catalyst of Example 3, where the Pt-supported mixed oxide Pt/CeZrO is substituted for the Pt-doped mixed oxide in the catalyst of Example 3. The supports used were monolithic supports of cordierite.

TABLE 5

| | Constituents of layer | Constituents supported by impregnation |
|---|---|---|
| Outer catalytic layer | Rh/Al$_2$O$_3$ = 50 g/L (Rh = 0.2 g/L) | Pt = 0.5 g/L Rh = 0.1 g/L |
| Inner catalytic layer | Pt-CeZrO = 135 g/L (Pt = 0.5 g/L) Al$_2$O$_3$ = 135 g/L | Ba = 30 g/L K = 6 g/L Sr = 10 g/L Mg = 10 g/L |

—Lean-NOx Conversion Measurement—

Each of the above catalysts was subjected to aging treatment in a normal atmosphere at 900° C. for 24 hours. Then, each catalyst was put in a fixed bed flow reactor. In the reactor, first, a simulated exhaust gas (gas composition A) having a lean air-fuel ratio shown in Table 2 was caused to flow for 60 seconds, and then, another simulated exhaust gas (gas composition B) having a rich air-fuel ratio shown in Table 2 was caused to flow for 60 seconds. After this cycle was repeated five times, the gas composition was changed from the rich air-fuel ratio to the lean air-fuel ratio. Further, measurements were made of the NOx conversion (lean-NOx conversion) for 60 seconds from that time point when the gas composition was changed to the lean air-fuel ratio. The space velocity SV was set at 25,000 h$^{-1}$. During the test, the temperature of each simulated exhaust gas at the catalyst entrance was set within the range from 250° C. to 500° C. inclusive. The determination results are shown in FIG. 16.

—Rich-HC Conversion Measurement—

Each of the above catalysts was subjected to aging treatment in a normal atmosphere at 900° C. for 24 hours. Then, each catalyst was put in a fixed bed flow reactor. In the reactor, a simulated exhaust gas (gas composition A) having a lean air-fuel ratio was caused to flow for 60 seconds, and then, another simulated exhaust gas (gas composition B) having a rich air-fuel ratio was caused to flow for 60 seconds. This cycle was repeated five times. Further, measurements were made of the HC conversion (rich-HC conversion) for 60 seconds under the simulated exhaust gas (gas composition B) having a rich air-fuel ratio in the fifth cycle. The conditions of catalyst temperature, simulated exhaust gas temperature and space velocity were the same as in the measurements of lean-NOx conversion. The gas compositions A and B are shown in Table 2. The determination results are show in FIG. 17.

Figure 16:
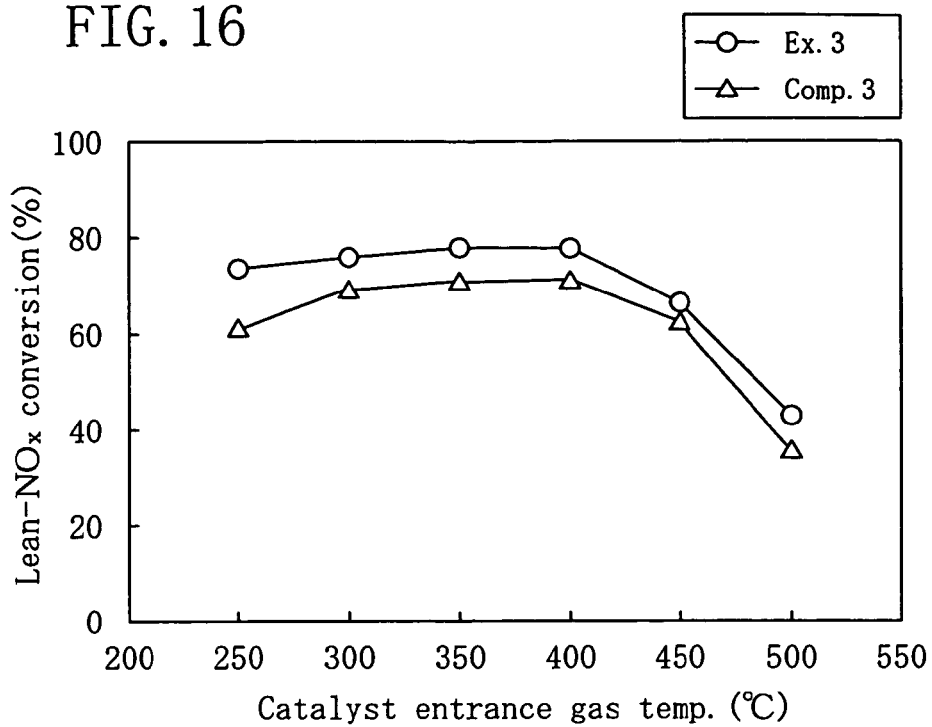
FIG. 16 is a graph showing the lean-NOx conversions of catalysts of Example 3 and Comparative example 3.
Figure 17:
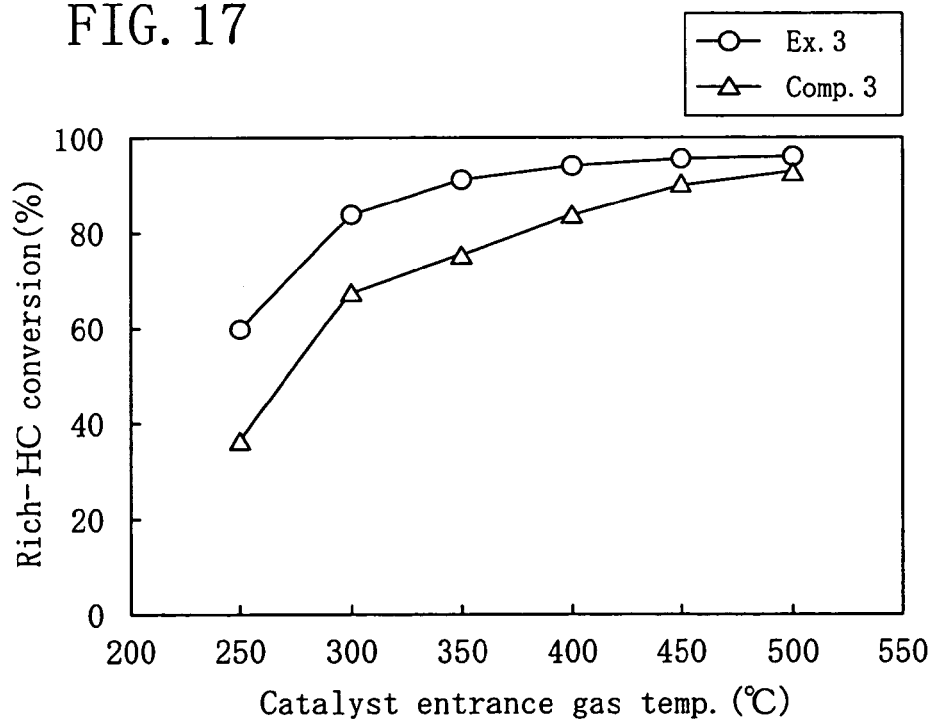
FIG. 17 is a graph showing the rich-HC conversions of the catalysts of Example 3 and Comparative example 3.

FIG. 16 shows that the catalyst of Example 3 is higher in the lean-NOx conversion than the catalyst of Comparative example 3. It can be seen from this that when a Pt-doped mixed oxide Pt—CeZrO, i.e., a Ce-based mixed oxide with Pt atoms placed at and/or between crystal lattice points and exposed at the surface of each crystallite, is employed as an oxygen storage component, this improves the NOx storage capacity of the NOx storage component at lean air-fuel ratios. Further, FIG. 17 shows that the catalyst of Example 3 is higher in the rich-HC conversion than the catalyst of Comparative example 3. It can be seen from this that Pt in the Pt-doped mixed oxide Pt—CeZrO effectively acts to oxidize HC also after aging and in turn effectively acts to reduce NOx released from the NOx storage component at rich air-fuel ratios.

Figure 18:
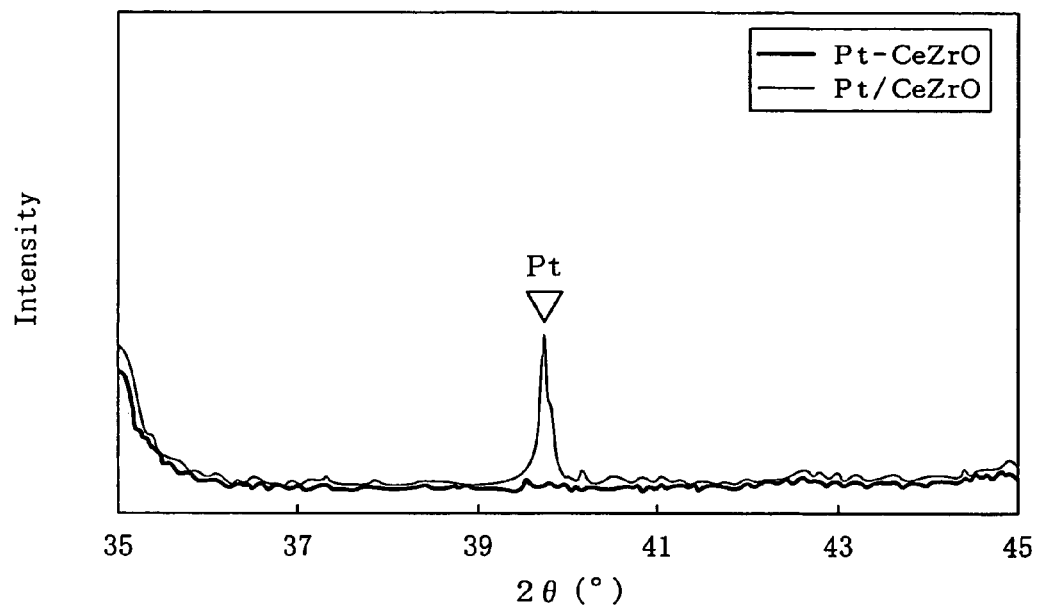
FIG. 18 is an XRD chart of Pt in a Ce—Zr mixed oxide coprecipitated with Pt and an evaporatively dried Pt-supported Ce—Zr mixed oxide which were observed in terms of x-ray diffraction peak intensity.

The reason why the catalyst of Example 3 exhibited high NOx conversion is probably that Pt in the Pt-doped mixed oxide Pt—CeZrO was restrained from sintering due to heat-aging. FIG. 18 shows XRD (X-ray Diffractometry) analysis results of Pt in a Pt-doped mixed oxide Pt—CeZrO in the catalyst of Example 3 and Pt in a Pt-supported mixed oxide Pt/CeZrO in the catalyst of Comparative example 3 which were aged in a normal atmosphere at 900° C. for 24 hours and then measured in terms of x-ray diffraction peak intensity. As can be seen from FIG. 18, Pt in the Pt-supported mixed oxide Pt/CeZrO in the catalyst of Comparative example 3 clearly exhibits its peak x-ray diffraction intensity in the vicinity of 39.7° C. On the other hand, Pt in the Pt-doped mixed oxide Pt—CeZrO in the catalyst of Example 3 exhibits no peak x-ray diffraction intensity, which proves that the sintering of Pt was restrained.

The catalyst of Example 3 is a two-layer catalyst. However, the catalyst is not limited to the two-layer structure. The catalyst may have a single layer structure, for example, in which only the inner catalytic layer of the catalyst of Example 3 is formed on a honeycomb support, or may have a multi-layer structure, for example, which contains another or other catalytic layers in addition to the inner and outer catalytic layers of the catalyst of Example 3.

In the above embodiments, the exhaust gas purification catalyst is applied to lean-burn gasoline engines. However, the exhaust gas purification catalyst of the present invention is applicable to other various kinds of engines such as diesel engines.

What is claimed is:

1. An exhaust gas purification catalyst for removing NOx in exhaust gas from an engine by reduction, the catalyst comprising:
    a honeycomb support; and
    a catalytic coating supported to walls of cells of the honeycomb support,
    wherein the catalytic coating comprises at least a precious metal-doped catalytic layer containing:
    a NOx storage component;
    a Ce-based mixed oxide in which Ce atoms are placed at crystal lattice points of the mixed oxide, the Ce-based mixed oxide acting as an oxygen storage component; and
    a catalytic precious metal the atoms of which are placed at and/or between crystal lattice points of the mixed oxide.

2. The exhaust gas purification catalyst of claim 1, wherein the catalytic precious metal is Rh and the Rh atoms are placed in crystallites of the Ce-based mixed oxide.

3. The exhaust gas purification catalyst of claim 2, wherein the catalytic coating further comprises an outer catalytic layer overlaid on the precious metal-doped catalytic layer and containing one or more kinds of catalytic metals and a NOx storage component.

4. The exhaust gas purification catalyst of claim 3, wherein the precious metal-doped catalytic layer further contains Pt, and
    the outer catalytic layer contains Pt and Rh as the catalytic metals, the Rh being supported on alumina.

5. The exhaust gas purification catalyst of claim 2, wherein some of the Rh atoms placed at and/or between crystal lattice points of the Ce-based mixed oxide are exposed at the surfaces of the crystallites of the mixed oxide.

6. The exhaust gas purification catalyst of claim 1, wherein the Ce-based mixed oxide is a Ce—Zr mixed oxide in which Ce atoms and Zr atoms are placed at crystal lattice points of the mixed oxide.

7. The exhaust gas purification catalyst of claim 1, wherein
    the Ce-based mixed oxide and alumina on which Rh is supported are mixed in the precious metal-doped catalytic layer,
    the atoms of the catalytic precious metal placed at and/or between crystal lattice points of the Ce-based mixed oxide are Rh atoms, and
    Pt is supported on the Ce-based mixed oxide.

8. The exhaust gas purification catalyst of claim 7, wherein the catalytic coating further comprises an inner catalytic layer formed on the inside of the precious metal-doped catalytic layer and containing a NOx storage component.

9. The exhaust gas purification catalyst of claim 8, wherein
    the inner catalytic layer further contains an oxygen storage component,
    the Ce-based mixed oxide in the precious metal-doped catalytic layer has an oxygen storage property that the peak of amount of oxygen release appears in a particular temperature range, and
    the oxygen storage component in the inner catalytic layer has an oxygen storage property that the amount of oxygen release is less affected by the temperature change over a wide temperature range from lower to higher temperatures than the particular temperature range as compared with the precious metal-doped catalytic layer.

10. The exhaust gas purification catalyst of claim 9, wherein
    the Ce-based mixed oxide in the precious metal-doped catalytic layer is a Ce—Zr mixed oxide in which Ce atoms and Zr atoms are placed at crystal lattice points of the mixed oxide, and
    the oxygen storage component in the inner catalytic layer is a Ce—Pr mixed oxide in which Ce atoms and Pr atoms are placed at crystal lattice points of the mixed oxide.

11. The exhaust gas purification catalyst of claim 1, wherein the catalytic precious metal is Pt and at least some of the Pt atoms placed at and/or between crystal lattice points of the Ce-based mixed oxide are exposed at the surfaces of crystallites of the Ce-based mixed oxide.

12. The exhaust gas purification catalyst of claim 11, wherein the catalytic coating further comprises an outer catalytic layer overlaid on the precious metal-doped catalytic layer and containing one or more kinds of catalytic metals and a NOx storage component.

13. The exhaust gas purification catalyst of claim 11, wherein the precious metal-doped catalytic layer further contains Rh supported on the Ce-based mixed oxide by bringing a solution containing Rh into contact with the Ce-based mixed oxide and calcining the solution.

14. The exhaust gas purification catalyst of claim 11, wherein the Ce-based mixed oxide is a Ce—Zr mixed oxide in which Ce atoms and Zr atoms are placed at crystal lattice points of the mixed oxide.

15. The exhaust gas purification catalyst of claim 12, wherein
    the outer catalytic layer further contains alumina on which Rh is supported as the catalytic metal,
    the precious metal-doped catalytic layer further contains Pt supported on the Ce-based mixed oxide in addition to the Pt atoms which are placed at and/or between crystal lattice points of the Ce-based mixed oxide and some of which are exposed at the surfaces of crystallites of the Ce-based mixed oxide, and
    the supported Pt and the NOx storage component in the precious metal-doped catalytic layer are supported on the Ce-based mixed oxide by bringing a solution containing Pt and the NOx storage component into contact with the Ce-based mixed oxide and calcining the solution.

* * * * *